(12) United States Patent
Suzuki

(10) Patent No.: US 9,944,151 B2
(45) Date of Patent: Apr. 17, 2018

(54) VEHICLE AIR CONDITIONER

(71) Applicant: Sanden Holdings Corporation, Isesaki-shi, Gunma (JP)

(72) Inventor: Kenichi Suzuki, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 165 days.

(21) Appl. No.: 14/889,129

(22) PCT Filed: May 19, 2014

(86) PCT No.: PCT/JP2014/063142
§ 371 (c)(1),
(2) Date: Nov. 4, 2015

(87) PCT Pub. No.: WO2014/188984
PCT Pub. Date: Nov. 27, 2014

(65) Prior Publication Data
US 2016/0082810 A1   Mar. 24, 2016

(30) Foreign Application Priority Data
May 20, 2013   (JP) ................... 2013-106440

(51) Int. Cl.
*B60H 1/00*   (2006.01)
*F25B 49/02*   (2006.01)
(Continued)

(52) U.S. Cl.
CPC ......... *B60H 1/00921* (2013.01); *F25B 41/04* (2013.01); *F25B 49/02* (2013.01);
(Continued)

(58) Field of Classification Search
CPC ... B60H 1/00914; B60H 1/00921; F25B 5/04; F25B 6/04; F25B 40/00; F25B 40/02; F25B 41/04; F25B 49/04; F25B 2400/0409
See application file for complete search history.

(56) References Cited

U.S. PATENT DOCUMENTS

| | | |
|---|---|---|
| 4,833,893 A | 5/1989 | Morita |
| 6,347,528 B1 * | 2/2002 | Iritani ................ B60H 1/00357 62/323.1 |
| 2011/0167850 A1 | 7/2011 | Itoh et al. |

FOREIGN PATENT DOCUMENTS

| | | |
|---|---|---|
| CN | 102734969 A | 10/2012 |
| JP | S63-021448 A | 1/1988 |

(Continued)

OTHER PUBLICATIONS

Japan Patent Office, Notification of Reasons for Refusal for Patent Application No. JP 2013-106440, issued on Aug. 30, 2016.
(Continued)

*Primary Examiner* — Marc Norman
(74) *Attorney, Agent, or Firm* — Baker Botts L.L.P.

(57) ABSTRACT

There is disclosed a vehicle air conditioner capable of preventing or inhibiting deterioration of a vehicle interior heating capability which is caused by frost formation to an outdoor heat exchanger. The vehicle air conditioner includes a compressor 2, an air flow passage 3, a radiator 4, a heat absorber 9, and an outdoor heat exchanger 7, and executes a heating mode in which a refrigerant discharged from the compressor radiates heat in the radiator, is decompressed and then absorbs heat in the outdoor heat exchanger. The vehicle air conditioner includes an accumulator 12 disposed on a suction side of the compressor, and a bypass circuit 24B disposed from a refrigerant outlet side of the radiator to an inlet side of the accumulator. A controller has a mode in (Continued)

which the refrigerant flowing out from the radiator is passed through the bypass circuit, does not flow through the outdoor heat exchanger, but flows into the accumulator.

20 Claims, 22 Drawing Sheets

(51) Int. Cl.
*F25B 41/04* (2006.01)
*F25B 40/00* (2006.01)
*F25B 5/04* (2006.01)
*F25B 6/04* (2006.01)
*F25B 40/02* (2006.01)

(52) U.S. Cl.
CPC . *F25B 5/04* (2013.01); *F25B 6/04* (2013.01); *F25B 40/00* (2013.01); *F25B 40/02* (2013.01); *F25B 2400/0409* (2013.01); *F25B 2400/0411* (2013.01); *F25B 2400/13* (2013.01); *F25B 2600/2507* (2013.01); *F25B 2700/02* (2013.01); *F25B 2700/195* (2013.01); *F25B 2700/197* (2013.01); *F25B 2700/1933* (2013.01); *F25B 2700/2106* (2013.01); *F25B 2700/21152* (2013.01); *F25B 2700/21163* (2013.01); *F25B 2700/21173* (2013.01)

(56) References Cited

FOREIGN PATENT DOCUMENTS

| JP | 2001-063347 A | 3/2001 |
|---|---|---|
| JP | 2011-140291 A | 7/2011 |
| JP | 2012-504747 A | 2/2012 |
| JP | 2012-096757 A | 5/2012 |
| JP | 2012-137207 A | 7/2012 |
| JP | 2012137207 A | 7/2012 |
| JP | 2012-176660 A | 9/2012 |
| JP | 2012-220072 A | 11/2012 |
| JP | 2013-015264 A | 1/2013 |
| JP | 2013-068407 A | 4/2013 |

OTHER PUBLICATIONS

The State Intelelctual Property Office of People's Republic of China, First Office Action for Patent Application No. CN 201480029116.6, dated Aug. 29, 2016.

Japan Patent Office, International Search Report for International Application No. PCT/JP2014/063142 (counterpart to above-captioned patent application), dated Jul. 29, 2014.

Japan Patent Office, Second Notification of Reasons for Refusal for Patent Application No. JP 2013-106440, dated Jan. 5, 2017.

The State Intellectual Property Office of the People's Replublic of China, Notice of the Second Office Action for Patent Application No. CN 201480029116.6, dated Apr. 19, 2017.

Patent Reexamination Board of the Patent Office of State Intellectual Property Office of The People'S Republic of China, Decision on Reexamination for Patent Application No. CN 201480029116.6, dated Feb. 12, 2018.

* cited by examiner

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2014/063142, filed on May 19, 2014, which claims the benefit of Japanese Patent Application No. JP 2013-106440, filed on May 20, 2013, the disclosures of which are incorporated herein by reference in their entirety.

TECHNICAL FIELD

The present invention relates to an air conditioner of a so-called heat pump system which conditions air in a vehicle interior, and more particularly, it relates to an air conditioner applicable to a hybrid car or an electric car.

BACKGROUND ART

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let the refrigerant radiate or absorb heat, and which executes respective operation modes of a heating operation in which the refrigerant discharged from the compressor radiates heat in the radiator and the refrigerant by which heat has been radiated in this radiator absorbs heat in the outdoor heat exchanger, a dehumidifying and heating operation in which the refrigerant discharged from the compressor radiates heat in the radiator and the refrigerant by which heat has been radiated in the radiator absorbs heat only in the heat absorber or in this heat absorber and the outdoor heat exchanger, a cooling operation in which the refrigerant discharged from the compressor radiates heat in the outdoor heat exchanger and absorbs heat in the heat absorber, and a dehumidifying and cooling operation in which the refrigerant discharged from the compressor radiates heat in the radiator and the outdoor heat exchanger and absorbs heat in the heat absorber (e.g., see Patent Document 1).

CITATION LIST

Patent Documents

Patent Document 1: Japanese Patent Application Publication No. 2012-176660

SUMMARY OF THE INVENTION

Problems to be Solved by the Invention

Here, in a heating operation, an outdoor heat exchanger absorbs heat from outdoor air, and hence the outdoor heat exchanger is frosted. Further, when frost grows in this outdoor heat exchanger, heat absorbing capability from the outdoor air remarkably deteriorates, and hence there has been the problem that a temperature of air to be blown into a vehicle interior lowers and comfort is impaired.

The present invention has been developed to solve such conventional technical problems, and an object thereof is to provide a vehicle air conditioner capable of preventing or inhibiting deterioration of a vehicle interior heating capability in accordance with frosting on an outdoor heat exchanger.

Means for Solving the Problems

A vehicle air conditioner of the present invention includes a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means being configured to execute a heating mode in which the refrigerant discharged from the compressor radiates heat in the radiator and the refrigerant by which heat has been radiated is decompressed and then absorbs heat in the outdoor heat exchanger, the vehicle air conditioner including a bypass circuit disposed from a refrigerant outlet side of the radiator to a suction side of the compressor, and being characterized in that the control means has a mode in which all or a part of the refrigerant flowing out from the radiator is passed through the bypass circuit and is not passed through the outdoor heat exchanger but is returned to the suction side of the compressor.

The vehicle air conditioner of the invention of claim 2 is characterized in that in the above invention, the control means has frost formation condition estimating means for estimating a frost formation condition to the outdoor heat exchanger, and passes the refrigerant through the bypass circuit when frost is formed to the outdoor heat exchanger or when the frost formation to the outdoor heat exchanger is predicted on the basis of the estimation of this frost formation condition estimating means.

The vehicle air conditioner of the invention of claim 3 is characterized in that in the above respective inventions, the control means passes the refrigerant through the bypass circuit, when an external power source supplies power to the compressor or a battery which supplies the power to drive the compressor.

The vehicle air conditioner of the invention of claim 4 is characterized in that the above respective inventions include decompressing means for decompressing the refrigerant flowing through the bypass circuit; or the decompressing means and a discharge side heat exchanger which performs heat exchange between the refrigerant decompressed by the decompressing means and the refrigerant discharged from the compressor before flowing into the radiator.

The vehicle air conditioner of the invention of claim 5 is characterized in that in the above invention, the control means controls a subcool degree of the refrigerant in an outlet of the radiator by the decompressing means, when the control means passes the refrigerant through the bypass circuit.

The vehicle air conditioner of the invention of claim 6 is characterized in that in the above respective inventions, the control means has a mode in which the refrigerant flowing out from the radiator is passed through the outdoor heat exchanger and the bypass circuit.

The vehicle air conditioner of the invention of claim 7 is characterized in that the above respective inventions include an injection circuit which distributes a part of the refrigerant flowing out from the radiator to return the part to the middle of the compression by the compressor.

The vehicle air conditioner of the invention of claim 8 is characterized in the above invention includes decompressing means for decompressing the refrigerant flowing through the injection circuit, and a discharge side heat exchanger which performs heat exchange between the refrigerant decompressed by this decompressing means and the refrigerant discharged from the compressor before flowing into the radiator.

The vehicle air conditioner of the invention of claim 9 is characterized in that in the above invention, the control means controls a superheat degree of the refrigerant returning to the compressor by the decompressing means, when the control means passes the refrigerant through the injection circuit.

The vehicle air conditioner of the invention of claim 10 is characterized in that in the inventions of claim 7 to claim 9, the bypass circuit and the injection circuit form a common circuit on an upstream side of the refrigerant, and in this common circuit, there are disposed decompressing means for decompressing the refrigerant and a discharge side heat exchanger which performs heat exchange between the refrigerant decompressed by this decompressing means and the refrigerant discharged from the compressor before flowing into the radiator, and the bypass circuit and the injection circuit are branched in a distributing valve device positioned on a downstream side of this discharge side heat exchanger.

The vehicle air conditioner of the invention of claim 11 is characterized in that in the inventions of claim 7 to claim 10, the control means has a mode in which the refrigerant flowing out from the radiator is passed through the bypass circuit and the injection circuit.

The vehicle air conditioner of the invention of claim 12 is characterized in that in the inventions of claim 7 to claim 11, the control means has a mode in which the refrigerant flowing out from the radiator is passed through the outdoor heat exchanger, the bypass circuit and the injection circuit.

Advantageous Effect of the Invention

According to the present invention, in a vehicle air conditioner including a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means being configured to execute a heating mode in which the refrigerant discharged from the compressor radiates heat in the radiator and the refrigerant by which heat has been radiated is decompressed and then absorbs heat in the outdoor heat exchanger, there is further included a bypass circuit disposed from a refrigerant outlet side of the radiator to a suction side of the compressor, and the control means has a mode in which all or a part of the refrigerant flowing out from the radiator is passed through the bypass circuit and is not passed through the outdoor heat exchanger but is returned to the suction side of the compressor. Therefore, when the refrigerant flowing out from the radiator is returned to the suction side of the compressor by use of this bypass circuit, the refrigerant flowing into the outdoor heat exchanger can be obstructed, or an amount of the refrigerant to flow through the outdoor heat exchanger can be decreased.

In consequence, frosting onto the outdoor heat exchanger can be prevented or inhibited, and the refrigerant returned to the suction side of the compressor is compressed again by the compressor and discharged to the radiator, and hence it is possible to prevent or inhibit deterioration of a heating capability by the radiator.

In particular, as in the invention of claim 2, the control means has frost formation condition estimating means for estimating a frost formation condition to the outdoor heat exchanger, and passes the refrigerant through the bypass circuit when frost is formed to the outdoor heat exchanger or when the frost formation to the outdoor heat exchanger is predicted on the basis of the estimation of this frost formation condition estimating means, so that it is possible to precisely prevent or inhibit the frosting onto the outdoor heat exchanger.

Additionally, a hybrid car or an electric car in which so-called plug-in to charge a battery from an external power source is possible, as in the invention of claim 3, the control means passes the refrigerant through the bypass circuit, when the external power source supplies power to the compressor or a battery which supplies the power to drive the compressor. Consequently, the compressor is operated by the external power source or by the supplied power from the battery charged by the external power source to pass the refrigerant through the bypass circuit, preliminary heating can be performed before the car is started and in that regard, it is also possible to prevent or inhibit the frosting onto the outdoor heat exchanger.

Additionally, as in the invention of claim 4, there are disposed decompressing means for decompressing the refrigerant flowing through the bypass circuit; or the decompressing means and a discharge side heat exchanger which performs heat exchange between the refrigerant decompressed by the decompressing means and the refrigerant discharged from the compressor before flowing into the radiator, so that in, for example, an accumulator to be connected to the suction side of the compressor or in the discharge side heat exchanger, the refrigerant flowing through the bypass circuit can be evaporated, and it is possible to prevent liquid compression in the compressor.

In particular, as in the invention of claim 5, the control means controls a subcool degree of the refrigerant in an outlet of the radiator by the decompressing means, when the control means passes the refrigerant through the bypass circuit, so that it is possible to acquire the heating capability in the radiator without a hindrance when the refrigerant is passed through the bypass circuit.

Additionally, as in the invention of claim 6, the control means has a mode in which the refrigerant flowing out from the radiator is passed through the outdoor heat exchanger and the bypass circuit, so that it is possible to inhibit the frosting onto the outdoor heat exchanger while absorbing heat from outdoor air in the outdoor heat exchanger, and it is possible to realize heating by heat pumped up from the outdoor air in addition to heating by the refrigerant flowing through the bypass circuit and compressed in the compressor.

In the vehicle air conditioner of the invention of claim 7, the above respective inventions include an injection circuit which distributes a part of the refrigerant flowing out from the radiator to return the part to the middle of the compression by the compressor, and hence when the frosting is predicted, a gas is injected to the compressor by the injection circuit, so that it is possible to inhibit the frosting onto the outdoor heat exchanger. In consequence, it is possible to avoid deterioration of vehicle interior air conditioning due to the frosting and to achieve improvement of the heating capability by the radiator.

In this case, as in the invention of claim 8, there are disposed decompressing means for decompressing the refrigerant flowing through the injection circuit and a discharge side heat exchanger which performs heat exchange between the refrigerant decompressed by this decompressing means and the refrigerant discharged from the compressor before flowing into the radiator, so that the refrigerant to be returned to the middle of the compression of the compressor by the injection circuit can be evaporated by performing the heat exchange between the refrigerant and the discharged refrigerant of the compressor which has a higher temperature than the refrigerant flowing out from the radiator. In consequence, an amount of the gas to be injected to the compressor is sufficiently acquired and an amount of the refrigerant to be discharged from the compressor is increased, so that the improvement of the heating capability can be achieved.

At this time, as in the invention of claim 9, the control means controls a superheat degree of the refrigerant returning to the compressor by the decompressing means, when the control means passes the refrigerant through the injection circuit, whereby inflow of the liquid refrigerant to the middle of the compression by the compressor can be avoided, so that it is possible to safely realize the gas injection.

Additionally, as in the invention of claim 10, the bypass circuit and the injection circuit form a common circuit on an upstream side of the refrigerant, and in this common circuit, there are disposed decompressing means for decompressing the refrigerant and a discharge side heat exchanger which performs heat exchange between the refrigerant decompressed by this decompressing means and the refrigerant discharged from the compressor before flowing into the radiator, and the bypass circuit and the injection circuit are branched in a distributing valve device positioned on a downstream side of this discharge side heat exchanger, and hence the decompressing means and the discharge side heat exchanger can be used by both of the bypass circuit and the injection circuit, so that it is possible to decrease the number of components.

In addition, as in the invention of claim 11, the control means has a mode in which the refrigerant flowing out from the radiator is passed through the bypass circuit and the injection circuit, and hence the gas injection can be performed by passing the refrigerant flowing out from the radiator through the injection circuit while passing the refrigerant through the bypass circuit, so that it is possible to effectively realize both of the prevention or inhibition of the frosting onto the outdoor heat exchanger and the improvement of the heating capability of the radiator.

Furthermore, as in the invention of claim 12, the control means has a mode in which the refrigerant flowing out from the radiator is passed through the outdoor heat exchanger, the bypass circuit and the injection circuit, so that in addition to the above effects, heat sucked up from the outdoor air can be utilized for the heating.

MODE FOR CARRYING OUT THE INVENTION

Hereinafter, embodiments of the present invention will be described in detail with reference to the drawings.

Figure 1:
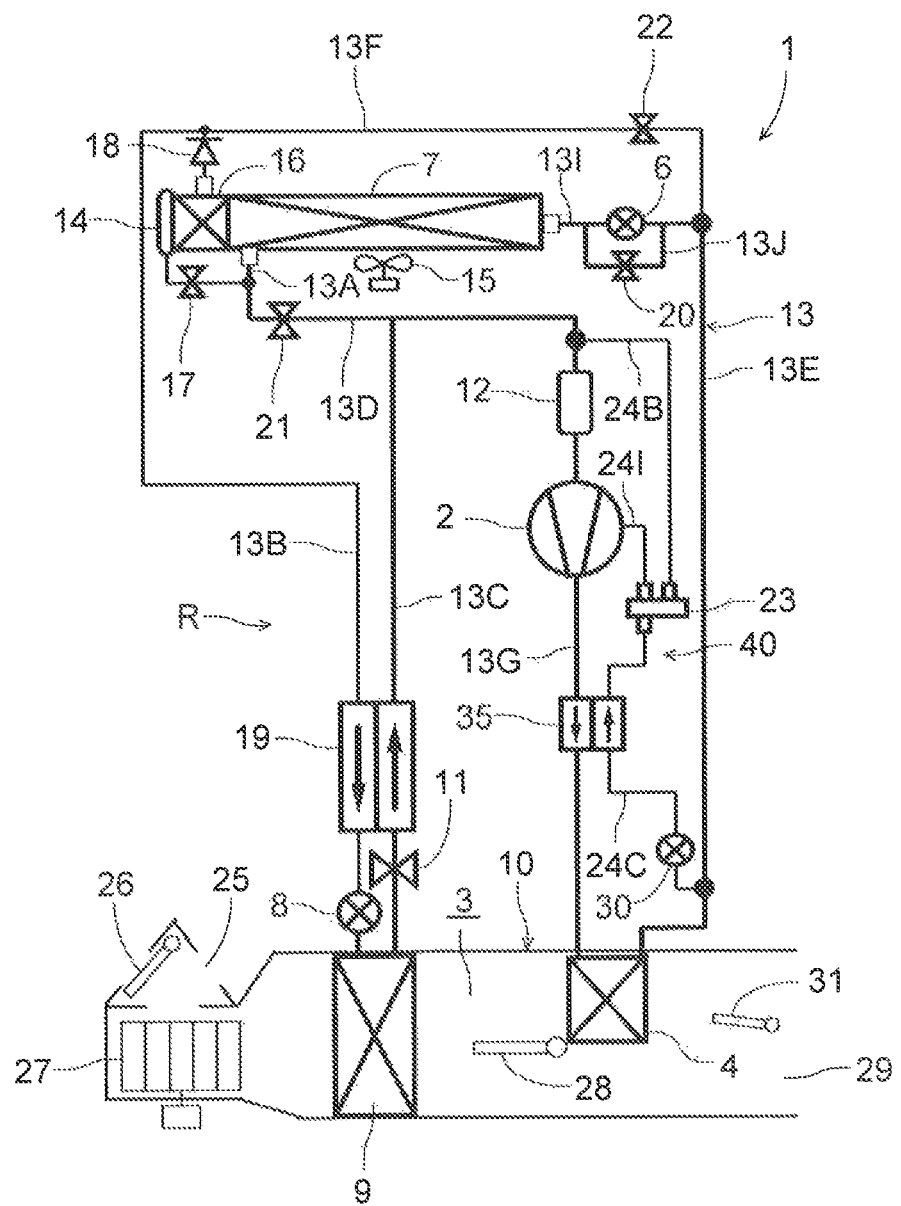
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is driven by the power of the battery. That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve as decompressing means for decompressing and expanding the refrigerant during the heating, an outdoor heat exchanger 7 which performs heat exchange between the refrigerant and outdoor air to function as the radiator (let the refrigerant radiate heat) during the cooling and function as an evaporator (let the refrigerant absorb heat) during the heating, an indoor expansion valve 8 constituted of an electric valve as decompressing means for decompressing and expanding the refrigerant, a heat absorber 9 disposed in the air flow passage 3 to let the refrigerant absorb heat from interior and exterior of the vehicle during the cooling and during the dehumidifying, an evaporation capability control valve 11 which regulates an evaporation capability in the heat absorber 9, an accumulator 12 which has a constant volume and is connected to a suction side of the compressor 2 to function as a refrigerant liquid reservoir (gas liquid separation) and the like, so that a refrigerant circuit R is constituted. It is to be noted that in the outdoor heat exchanger 7, an outdoor blower 15 to perform the heat exchange between the outdoor air and the refrigerant is disposed.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying. In addition, a bypass pipe 13J is connected in parallel with the outdoor expansion valve 6, and in the bypass pipe 13J, there is disposed a solenoid valve (an opening/closing valve) 20 which is opened in a cooling mode to pass the refrigerant by bypassing the outdoor expansion valve 6.

Furthermore, the refrigerant pipe 13E just extended out from the radiator 4 (before branching to the refrigerant pipe 13F and a refrigerant pipe 13I) is branched, and this branched refrigerant pipe is defined as a common circuit 24C. The common circuit 24C is connected to a return expansion valve 30 constituted of an electric valve as decompressing means for controlling after-mentioned bypassing and gas injection, the common circuit 24C on an outlet side of the return expansion valve 30 is disposed in a heat exchange relation with a refrigerant pipe 13G positioned on a discharge side of the compressor 2, and both the circuit and the valve constitute a discharge side heat exchanger 35.

On a downstream side of the discharge side heat exchanger 35, information common circuit 24C is connected to a three-way valve 23 as a distributing valve device. Further, the three-way valve 23 is connected to one branched end of an injection circuit 24I, and the other end of the injection circuit 24I communicates to be connected to the middle of the compression by the compressor 2. In addition, the three-way valve 23 is connected to one branched end of a bypass circuit 24B, and the other end of the bypass circuit 24B is connected to an inlet of the accumulator 12 positioned on a suction side of the compressor 2.

In this embodiment, the common circuit 24C, the return expansion valve 30, the discharge side heat exchanger 35, the three-way valve 23, the injection circuit 24I and the bypass circuit 24B constitute a return circuit 40. Additionally, in the return circuit 40, the common circuit 24C, the return expansion valve 30, the discharge side heat exchanger 35, the three-way valve 23 and the injection circuit 24I constitute an injection circuit of the present invention, and the common circuit 24C, the return expansion valve 30, the discharge side heat exchanger 35, the three-way valve 23 and the bypass circuit 24B constitute a bypass circuit of the present invention from a refrigerant outlet side of the radiator 4 through the accumulator 12 to the suction side of the compressor 2.

The above injection circuit of the present invention is a circuit which distributes a part of the refrigerant flowing out from the radiator 4 to return the part to the middle of the compression by the compressor 2 (the gas injection), the return expansion valve 30 decompresses the refrigerant flowing into the common circuit 24C, and then, the refrigerant flows into the discharge side heat exchanger 35. The refrigerant flowing into the discharge side heat exchanger 35 is discharged from the compressor 2 to the refrigerant pipe 13G, performs heat exchange between the refrigerant and the refrigerant which is to flow into the radiator 4, and absorbs heat from the refrigerant flowing through the refrigerant pipe 13G to evaporate. The refrigerant distributed to the common circuit 24C evaporates in the discharge side heat exchanger 35, and then flows from the three-way valve 23 through the injection circuit 24I to be returned to the middle of the compression by the compressor 2, whereby the gas injection to the compressor 2 is performed.

The above bypass circuit of the present invention is a circuit in which all (or a part as described later) of the refrigerant flowing out from the radiator 4 does not flow through the outdoor heat exchanger 7 but flows into the accumulator 12 (bypassing), and the return expansion valve 30 similarly decompresses the refrigerant flowing into the common circuit 24C, whereby the refrigerant flows into the discharge side heat exchanger 35. The refrigerant flowing into the discharge side heat exchanger 35 is discharged from the compressor 2 to the refrigerant pipe 13G, performs heat exchange between the refrigerant and the refrigerant which is to flow into the radiator 4, and absorbs heat from the refrigerant flowing through the refrigerant pipe 13G to evaporate. The refrigerant distributed to the common circuit 24C evaporates in the discharge side heat exchanger 35, and is then returned from the three-way valve 23 through the bypass circuit 24B to the accumulator 12 on the suction side of the compressor 2, to bypass the outdoor heat exchanger 7.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
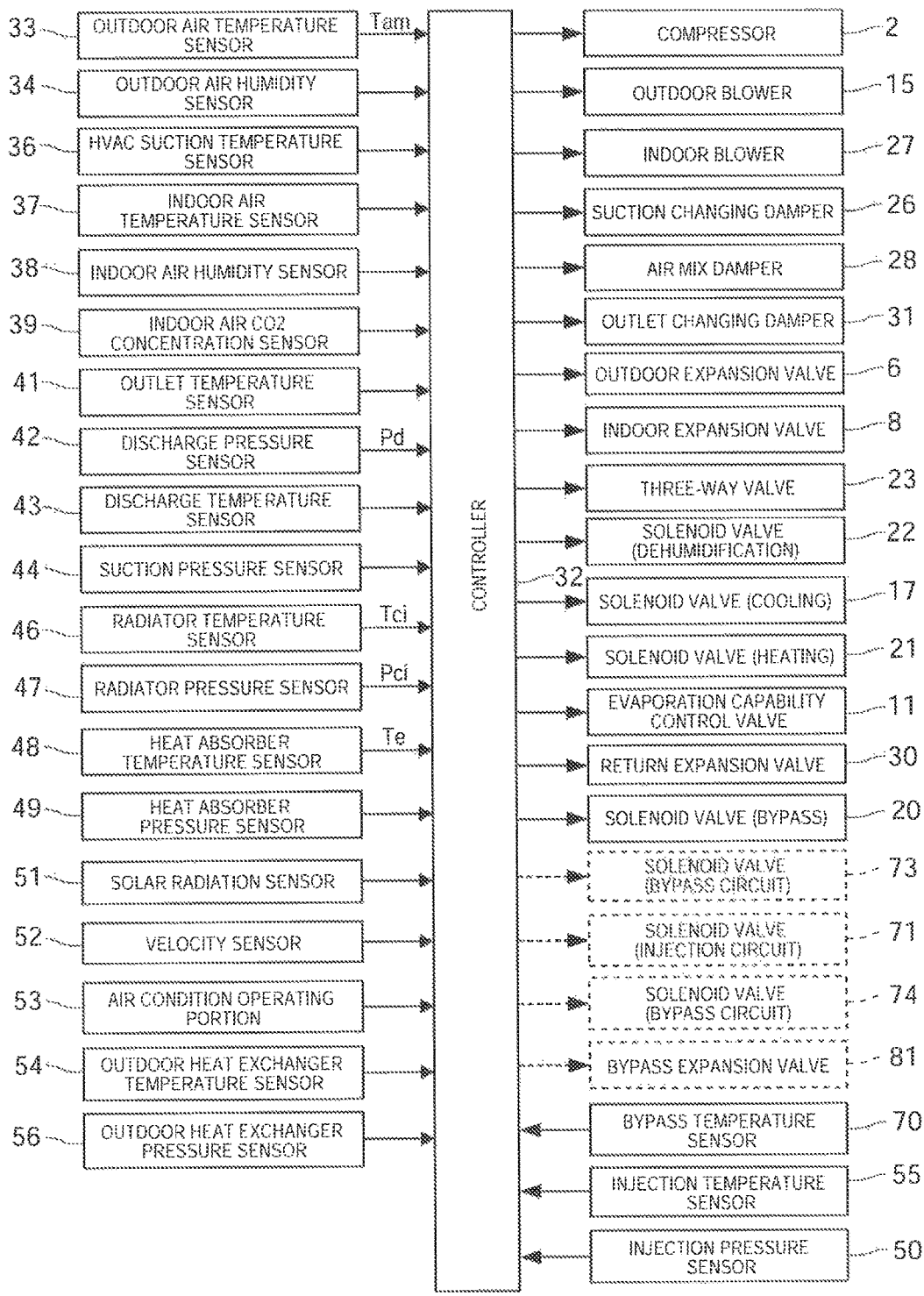
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the refrigerant which has just flowed out from the radiator 4, the temperature of the radiator 4 itself, or the temperature of the air immediately after heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the refrigerant which has just flowed out from the heat absorber 9, the temperature of the heat absorber 9 itself, or the temperature of the air immediately after cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

In addition, the input of the controller 32 is further connected to respective outputs of an injection pressure sensor 50 which detects a pressure of an injection refrigerant flowing from the three-way valve 23 through the injection circuit 24I to return to the middle of the compression by the compressor 2, and an injection temperature sensor 55 which detects a temperature of the injection refrigerant. Furthermore, the input of the controller 32 is also connected to an output of a bypass temperature sensor 70 which detects a temperature of a bypass refrigerant flowing from the three-way valve 23 through the bypass circuit 24B and returning to the accumulator 12.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 17, 20, 21 and 22, the three-way valve 23, the return expansion valve 30, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. It is to be noted that an operation and a function of the return circuit 40 will be described later. The refrigerant flowing into the outdoor expansion valve 6 is decompressed and then flows into the outdoor heat exchanger 7. The refrigerant flowing into the outdoor heat exchanger 7 evaporates, and the heat is pumped up from the outdoor air passed by running or the outdoor blower 15 (a heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence heating in the vehicle interior is performed.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows through the discharge side heat exchanger 35 into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed. The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure PCI) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4. In consequence, the high-temperature high-pressure gas refrigerant discharged from the compressor 2 flows through the discharge side heat exchanger 35 into the radiator 4. The air in the air flow passage 3 is not passed through the radiator 4, the air therefore only passes here, and the refrigerant flowing out from the radiator 4 flows through the refrigerant pipe 13E to reach the solenoid valve 20 and the outdoor expansion valve 6.

At this time, the solenoid valve 20 is opened, and hence the refrigerant bypasses the outdoor expansion valve 6, passes the bypass pipe 13J and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48.

(6) Gas Injection in Heating Mode

Figure 3:
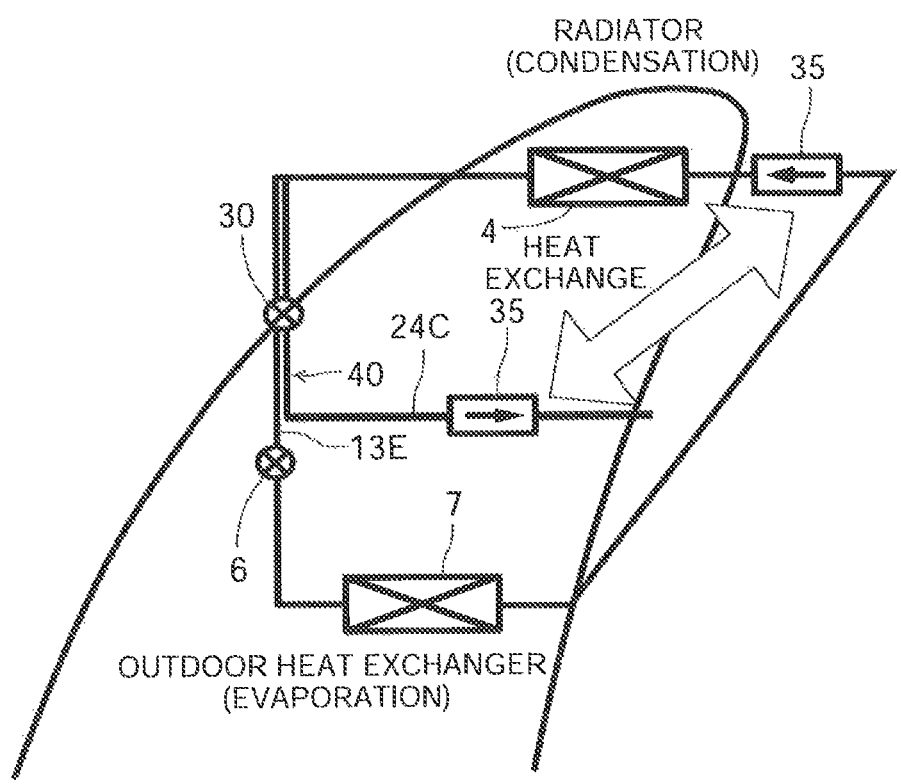
FIG. 3 is a p-h diagram of the vehicle air conditioner of FIG. 1.

Next, the gas injection in the above heating mode will be described. In this gas injection, the controller 32 switches the three-way valve 23 so that the refrigerant flows through the injection circuit 24I. FIG. 3 shows a p-h diagram of the vehicle air-conditioning device 1 of the present invention in the heating mode. The refrigerant flows out from the radiator 4 to enter the refrigerant pipe 13E, and then, as shown by arrows in FIG. 7, a part of the refrigerant is distributed to flow into the common circuit 24C of the return circuit 40, is decompressed by the return expansion valve 30, enters the discharge side heat exchanger 35 to perform the heat exchange with the discharged refrigerant of the compressor 2 (the refrigerant discharged from the compressor 2 before flowing into the radiator 4), and then absorbs heat to evaporate.

Figure 7:
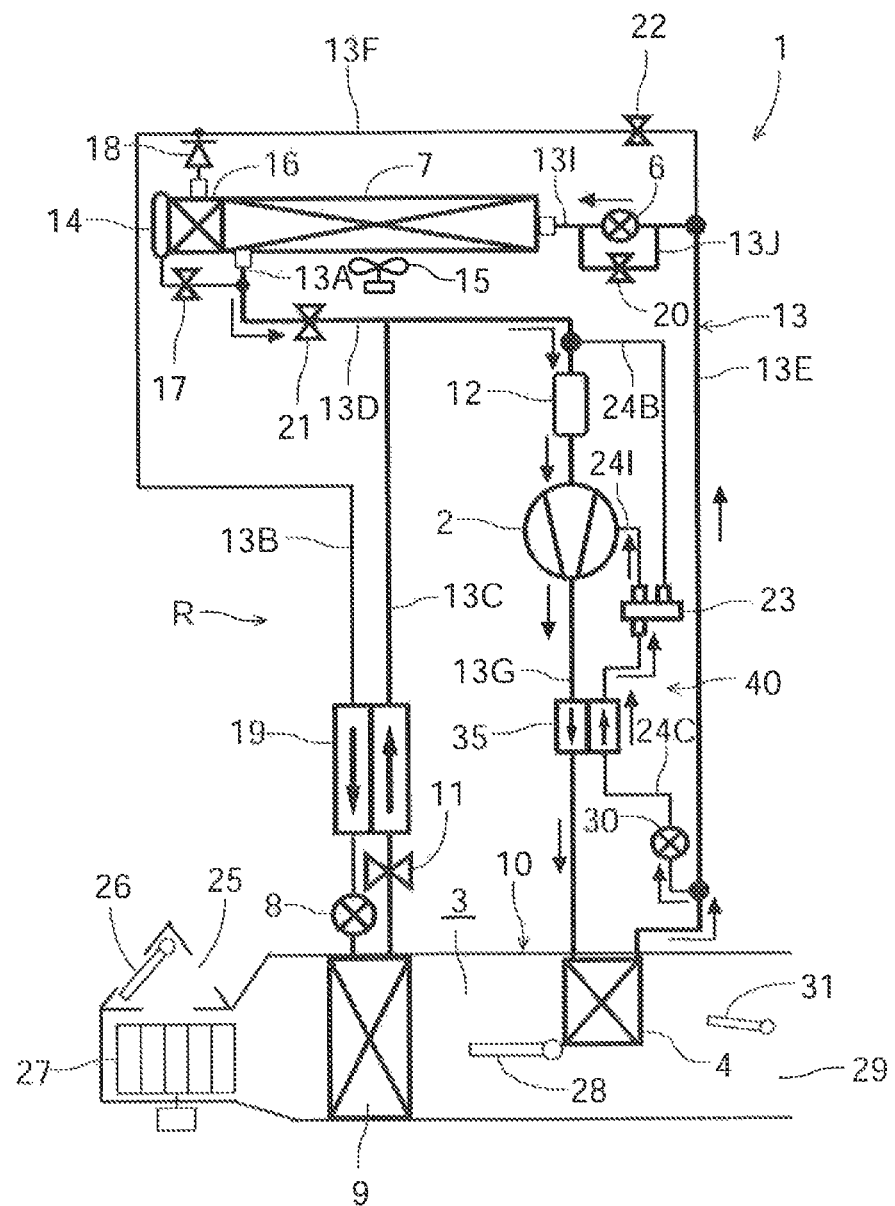
FIG. 7 is a view to explain a flow of a refrigerant of the vehicle air conditioner of FIG. 1 during gas injection by an injection circuit.

Afterward, the gas refrigerant evaporated in the discharge side heat exchanger 35 reaches the three-way valve 23, flows from the three-way valve 23 through the injection circuit 24I to return to the middle of the compression by the compressor 2, is further compressed together with the refrigerant sucked from the accumulator 12 to be compressed, and then discharged from the compressor 2 to the refrigerant pipe 13G again (shown by the arrows in FIG. 7).

In FIG. 3, two portions denoted with 35 and an arrow between the two portions indicate the heat exchange in the discharge side heat exchanger 35. When the refrigerant is returned from the injection circuit 24I of the return circuit 40 to the middle of the compression by the compressor 2, the amount of the refrigerant to be discharged from the compressor 2 increases, and hence the heating capability in the radiator 4 improves. However, when the liquid refrigerant returns to the compressor 2, liquid compression is caused, and hence the refrigerant to be returned from the injection circuit 24I to the compressor 2 has to be a gas.

Therefore, the controller 32 monitors a superheat degree (SH) of the refrigerant flowing toward the middle of the compression by the compressor 2, from the pressure and temperature of the refrigerant after the discharge side heat exchanger 35 which are detected by the injection pressure sensor 50 and the injection temperature sensor 55, respectively, as described later, and the controller controls the valve position of the return expansion valve 30 so that a predetermined superheat degree is attached in the heat exchange with the discharged refrigerant. However, in the present invention, the heat exchange between the remarkably high-temperature refrigerant discharged from the compressor 2 before flowing into the radiator 4 and the refrigerant flowing through the common circuit 24C of the return circuit 40 is performed in the discharge side heat exchanger 35, and hence a large heat exchange amount can be obtained. Therefore, even when the valve position of the return expansion valve 30 is enlarged to increase an injection amount, the refrigerant can also sufficiently evaporate in the discharge side heat exchanger 35, and a necessary superheat degree can be obtained.

In consequence, according to the embodiment, the gas injection amount to the compressor 2 can sufficiently be acquired and the amount of the refrigerant to be discharged from the compressor 2 can be increased to improve the heating capability, as compared with a case where the heat exchange between the refrigerant after the radiator and the injection refrigerant is performed as in a conventional technology.

Next, gas injection control of the return circuit 40 (the injection circuit in this case) in the above heating mode will be described with reference to FIG. 4 to FIG. 7.

Figure 4:
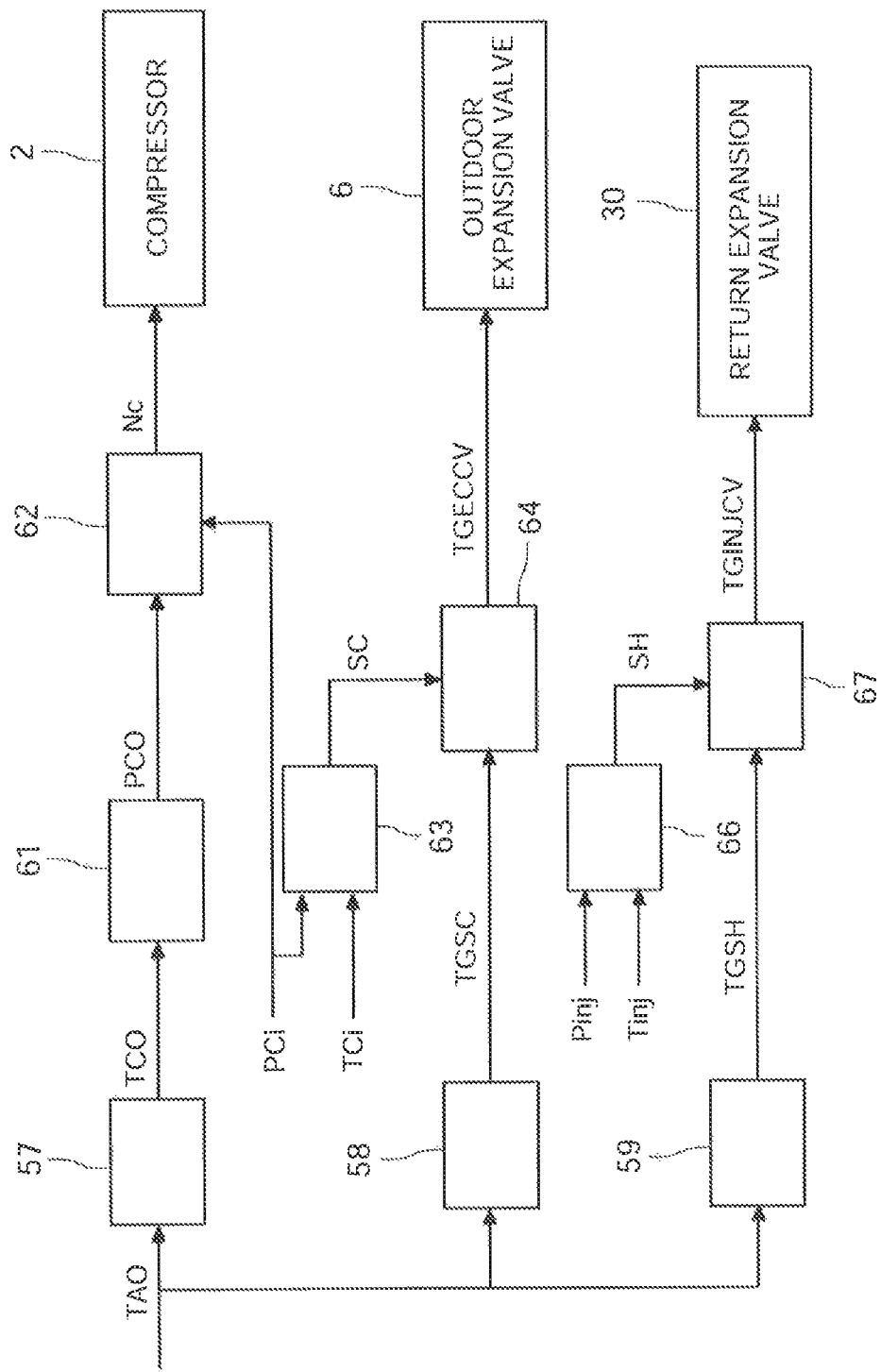
FIG. 4 is a control block diagram of the controller of FIG. 2.

(6-1) Control Block of Compressor, Outdoor Expansion Valve and Return Expansion Valve FIG. 4 shows a control block diagram of the compressor 2, the outdoor expansion valve 6 and the return expansion valve 30 by the controller 32 in the above heating mode. The controller 32 inputs a target outlet temperature TAO into a target radiator temperature calculating portion 57, a target radiator subcool degree calculating portion 58 and a target injection refrigerant superheat degree calculating portion 59. The target outlet temperature TAO is a target value of the temperature of the air blown out from the outlet 29 into the vehicle interior, and is calculated by the controller 32 in accordance with Equation (I) mentioned below.

$$TAO=(Tset-Tin)\times K+Tbal(f(Tset,SUN,Tam)) \quad (I)$$

Figure 5:
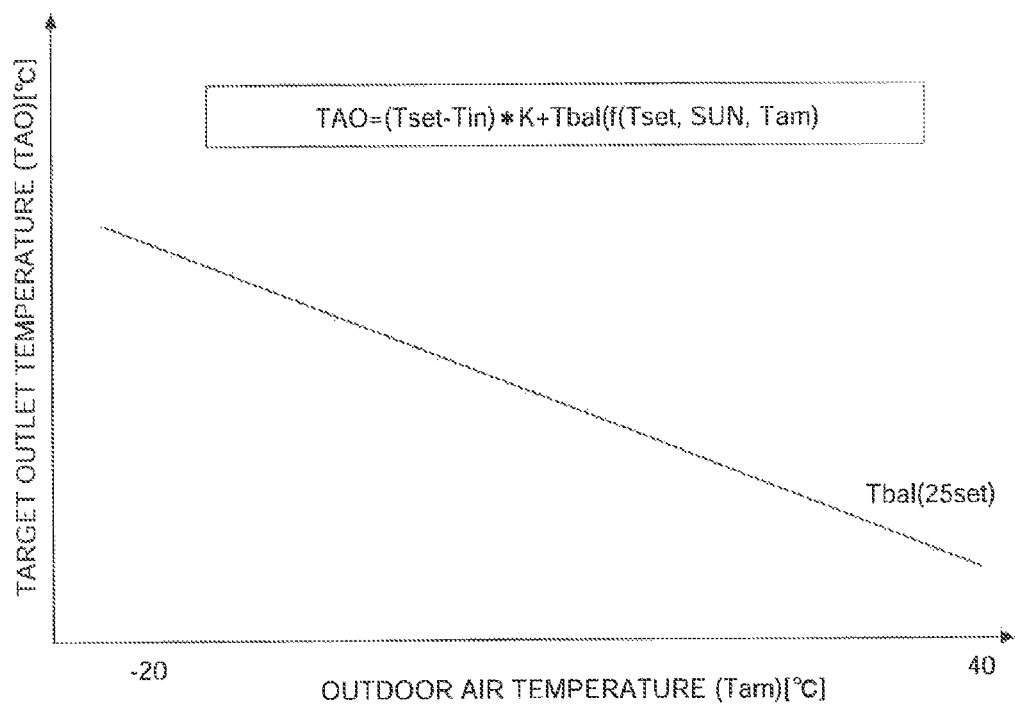
FIG. 5 is a diagram to explain determination of a target blowout temperature by the controller of FIG. 2.

Here, Tset is a set temperature in the vehicle interior which is set by the air conditioning operating portion 53, Tin is a temperature of interior air which is detected by the indoor air temperature sensor 37, K is a coefficient, and Tbal is a balance value calculated from the set temperature Tset, a solar radiation amount SUN detected by the solar radiation sensor 51, and an outdoor temperature Tam detected by the outdoor temperature sensor 33. Furthermore, in general, the target outlet temperature TAO heightens when the outdoor temperature Tam becomes lower, and lowers when the outdoor temperature Tam rises, as shown in FIG. 5.

The target radiator temperature calculating portion 57 of the controller 32 calculates a target radiator temperature TCO from the target outlet temperature TAO, and next a target radiator pressure calculating portion 61 of the controller 32 calculates a target radiator pressure PCO on the basis of the target radiator temperature TCO. Furthermore, a compressor revolution number calculating portion 62 of the controller 32 calculates a revolution number Nc of the compressor 2 on the basis of the target radiator pressure PCO and a pressure Pci of the radiator 4 (the radiator pressure) which is detected by the radiator pressure sensor 47, and the controller operates the compressor 2 at the revolution number Nc. That is, the controller 32 controls the pressure Pci of the radiator 4 in accordance with the revolution number Nc of the compressor 2.

In addition, the target radiator subcool degree calculating portion 58 of the controller 32 calculates a target radiator subcool degree TGSC of the radiator 4 on the basis of the target outlet temperature TAO. On the other hand, a radiator subcool degree calculating portion 63 of the controller 32 calculates a subcool degree of the refrigerant in the radiator 4 (a radiator subcool degree SC) on the basis of the radiator pressure Pci and the temperature of the radiator 4 (a radiator temperature Tci) which is detected by the radiator temperature sensor 46. Furthermore, a target outdoor expansion valve position calculating portion 64 of the controller calculates a target valve position of the outdoor expansion valve 6 (a target outdoor expansion valve position TGECCV) on the basis of the radiator subcool degree SC and the target radiator subcool degree TGSC. Furthermore, the controller 32 controls the valve position of the outdoor expansion valve 6 into the target outdoor expansion valve position TGECVV.

The radiator subcool degree calculating portion 63 of the controller 32 performs the calculation in such a direction as to raise the target radiator subcool degree TGSC, when the target outlet temperature TAO becomes higher, but the present invention is not limited to this embodiment, and the portion may perform the calculation on the basis of an after-mentioned difference (a capability difference) between a required heating capability Qtgt and a heating capability Qhp, the radiator pressure Pci, or a difference (a pressure difference) between the target radiator pressure PCO and the radiator pressure Pci. In this case, the controller 32 lowers the target radiator subcool degree TGSC, when the capability difference becomes smaller, the pressure difference becomes smaller, an air volume of the indoor blower 27 becomes smaller or the radiator pressure Pci becomes smaller.

Furthermore, the target injection refrigerant superheat degree calculating portion 59 of the controller 32 calculates a target value of the superheat degree of the injection refrigerant to be returned from the injection circuit 24I of the return circuit 40 to the middle of the compression by the compressor 2 (a target injection refrigerant superheat degree TGSH) on the basis of the target outlet temperature TAO. On the other hand, an injection refrigerant superheat degree calculating portion 66 of the controller 32 calculates a superheat degree INJSH of the injection refrigerant on the basis of a pressure of the injection refrigerant (an injection refrigerant pressure Pinj) which is detected by the injection pressure sensor 50 and a temperature of the injection refrigerant (an injection refrigerant temperature Tinj) which is detected by the injection temperature sensor 55.

Furthermore, a target return expansion valve position calculating portion 67 calculates a target valve position of the injection expansion valve 30 (a target return expansion valve position TGINJCV) on the basis of the injection refrigerant superheat degree INJSH and the target injection refrigerant superheat degree TGSH. Furthermore, the controller 32 controls the valve position of the return expansion valve 30 into the target return expansion valve position TGINJCV.

The target injection refrigerant superheat degree calculating portion 59 lowers the target injection refrigerant superheat degree TGSH, when the target outlet temperature TAO becomes higher (a hysteresis is present). When the target injection refrigerant superheat degree TGSH is lowered, the valve position of the return expansion valve 30 is enlarged to increase the injection amount. That is, when the target outlet temperature TAO becomes higher, the controller 32 increases the injection amount to be returned to the compressor 2 by the return expansion valve 30, so that the amount of the refrigerant to be discharged from the compressor 2 is increased to enhance the heating capability.

It is to be noted that the target injection refrigerant superheat degree TGSH is not limited to this embodiment, or additionally, the degree may be calculated on the basis of an after-mentioned difference (a capability difference) between the required heating capability Qtgt and the heating capability Qhp, a difference (a temperature difference) between the target radiator temperature TCO and the radiator temperature Tci (a detected value of an air temperature immediately after the radiator 4 or an estimated value of an air temperature immediately after the radiator 4), or a difference (a pressure difference) between the target radiator pressure PCO and the radiator pressure Pci, or any combination thereof. In this case, when the capability difference becomes larger, the controller 32 decreases the target injection refrigerant superheat degree TGSH, and when the temperature difference becomes larger, the controller decreases the target injection refrigerant superheat degree TGSH (a hysteresis is present), and when the pressure difference becomes larger, the controller decreases the target injection refrigerant superheat degree TGSH (a hysteresis is present).

Alternatively, when a limit line of the heating capability Qhp by the radiator 4 during the control in accordance with each target injection refrigerant superheat degree TGSH is beforehand measured or estimated at the after-mentioned required heating capability Qtgt in accordance with the outdoor temperature Tam, it may be judged whether or not the heating capability Qhp corresponding to the target injection refrigerant superheat degree TGSH satisfies the required heating capability, so that the target injection refrigerant superheat degree TGSH may be determined.

(6-2) Injection Executability Judgment

Next, one embodiment of an executability judgment of the gas injection by use of the injection circuit 24I of the return circuit 40 will be described with reference to FIG. 6. First, the controller 32 calculates the required heating capability Qtgt which is the heating capability required for the radiator 4, and the heating capability Qhp (i.e., a limit value of the heating capability) which can be generated by the radiator 4 when the refrigerant is not passed through the injection circuit 24I of the return circuit 40, i.e., when the gas injection is not performed, by use of Equation (II) and Equation (III).

$$Qtgt=(TCO-Te) \times Cpa \times \rho \times Qair \qquad (II)$$

$$Qhp=f(Tam, Nc, BLV, VSP, Te) \qquad (III)$$

Here, Te is the temperature of the heat absorber 9 which is detected by the heat absorber temperature sensor 48, Cpa is specific heat [kj/kg·K] of the air flowing into the radiator 4, ρ is a density (a specific volume) [kg/m$^3$] of the air flowing into the radiator 4, Qair is an air volume [m$^3$/h] of the air passing the radiator 4 (estimated from a blower voltage BLV of the indoor blower 27 or the like), and VSP is a velocity which can be obtained from the velocity sensor 52.

It is to be noted that in Equation (II), the temperature of the air flowing into the radiator 4 or the temperature of the air flowing out from the radiator 4 may be employed in place of or in addition to Qair. Additionally, the revolution number Nc of the compressor 2 of Equation (III) is one example of an index indicating a refrigerant flow rate, the blower voltage BLV is one example of an index indicating the air volume in the air flow passage 3, and the heating capability Qhp is calculated from these functions. In addition, Qhp may be calculated from one of these functions, an outlet refrigerant pressure of the radiator 4, an outlet refrigerant temperature of the radiator 4, an inlet refrigerant pressure of the radiator 4 and an inlet refrigerant temperature of the radiator 4, or any combination thereof.

Figure 6:
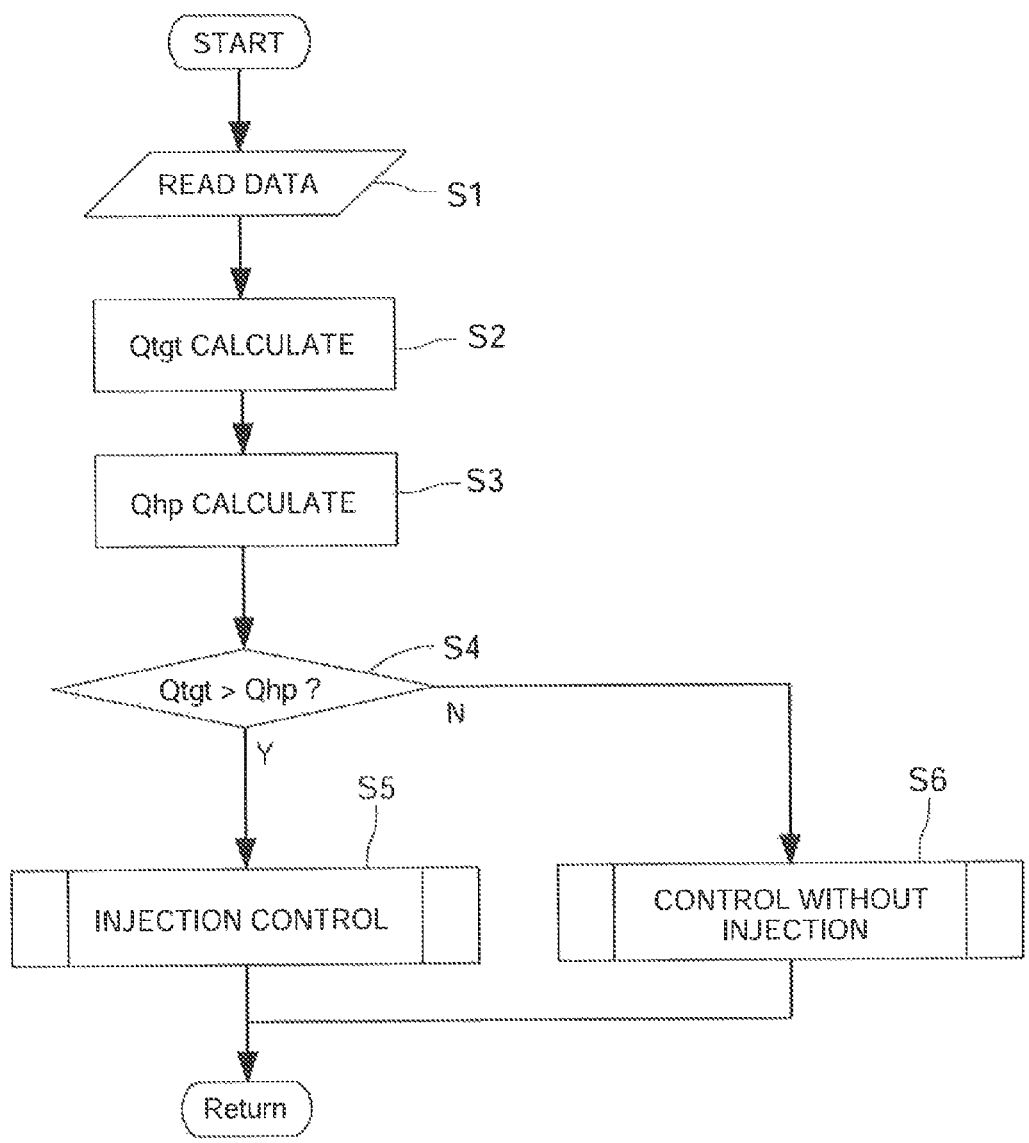
FIG. 6 is a flowchart showing an example of judgment of whether or not injection is to be executed by the controller of FIG. 2.

The controller 32 reads data from each sensor in step S1 of a flowchart of FIG. 6, and calculates the required heating capability Qtgt by use of Equation (II) mentioned above in step S2. Next, in step S3, the controller calculates the heating capability Qhp when the gas injection is not performed, by use of Equation (III) mentioned above, and judges whether or not the required heating capability Qtgt is larger than the heating capability Qhp in step S4.

When the required heating capability Qtgt is the heating capability Qhp or less, i.e., when the heating capability Qhp of the radiator 4 satisfies the required heating capability Qtgt, the step advances to step S6 in which it is judged that control without injection is executed (the gas injection is not executable), and when the required heating capability Qtgt is larger than the heating capability Qhp, i.e., when the heating capability Qhp of the radiator 4 is lower than the required heating capability Qtgt, the step advances to step S5 in which it is judged that control with injection is executed (the gas injection is executable). When the control without injection is judged in step S6, the controller 32 shuts off the return expansion valve 30 (the shut off position) and does not pass the refrigerant through the return circuit 40. On the other hand, when the control with injection is judged in the step S5, the valve position of the return expansion valve 30 is opened at a predetermined value, and the gas injection to the compressor 2 is performed.

In the embodiment, when the required heating capability Qtgt is higher than the heating capability Qhp after startup of the vehicle air-conditioning device 1, the controller 32 judges the control with injection, and by the control of the return expansion valve 30, the target injection superheat degree TGSH is lowered to increase the injection amount to be returned to the middle of the compression by the compressor 2 (INJSH is small). It is to be noted that the gas injection may be prohibited while a discharge pressure Pd of the compressor 2 is low immediately after the startup. Furthermore, when time passes from the startup and an operation state becomes more stable, the injection amount is decreased (INJSH is made larger), and when the heating capability Qhp finally satisfies the required heating capability Qtgt, the control without injection is performed.

In consequence, when the controller 32 compares the required heating capability Qtgt which is the heating capability required for the radiator 4 with the heating capability Qhp generated by the radiator 4 and the heating capability Qhp is lower than the required heating capability Qtgt, the refrigerant is passed through the injection circuit 24I of the return circuit 40 by the return expansion valve 30 and the three-way valve 23, so that it is possible to suitably control the gas injection to the compressor 2, to inhibit deterioration of an efficiency when the refrigerant flowing through the common circuit 24C is evaporated by the discharged refrigerant of the compressor 2, and to efficiently realize improvement of the heating capability by the gas injection.

It is to be noted that the present invention is not limited to the above embodiment, and the controller 32 calculates the required heating capability Qtgt on the basis of one of indexes indicating the temperature of the air flowing into the radiator 4, the temperature of the air flowing out from the radiator 4 and the volume of the air passing the radiator 4, or any combination of these indexes, and indexes indicating the specific heat Cpa of the air flowing into the radiator 4 and the density ρ of this air. Furthermore, the controller calculates the heating capability Qhp on the basis of one of indexes indicating the outdoor temperature Tam, the refrigerant flow rate, the air volume in the air flow passage 3, the velocity and the temperature Te of the heat absorber 9, or any combination of these indexes, so that it is possible to more accurately control the gas injection to the compressor 2.

Furthermore, as described above, the controller 32 controls the amount of the refrigerant to be returned from the injection circuit 24I of the return circuit 40 to the compressor 2 by the return expansion valve 30 on the basis of one of the difference between the required heating capability Qtgt required for the radiator 4 and the heating capability Qhp of the radiator, the difference between the target radiator temperature TCO and the radiator temperature Tci (the detected value of the air temperature immediately after the radiator 4 or the estimated value of the air temperature immediately after the radiator 4), the difference between the target radiator pressure PCO and the radiator pressure Pci, and the target outlet temperature to the vehicle interior, or any combination thereof, so that the amount of the refrigerant to be returned to the compressor 2 can accurately be regulated by the gas injection.

(7) Non-Frost Mode in Heating Mode in which Bypass Circuit 24B is Used

Next, there will be described a non-frost mode in which the bypass circuit 24B of the return circuit 40 is used in the heating mode. As described above, in the heating mode, the refrigerant evaporates in the outdoor heat exchanger 7, and hence frost is formed in the outdoor heat exchanger 7. Due to this frost formation, the heat exchange between the outdoor heat exchanger 7 and the outdoor air deteriorates, and hence the controller 32 executes the non-frost mode mentioned below. In this non-frost mode, the controller 32 shuts off the outdoor expansion valve 6, and closes the solenoid valves 17, 20, 21 and 22. In addition, the three-way valve 23 is switched so that the refrigerant flows through the bypass circuit 24B. Furthermore, the controller 32 controls the valve position of the return expansion valve 30.

Figure 9:
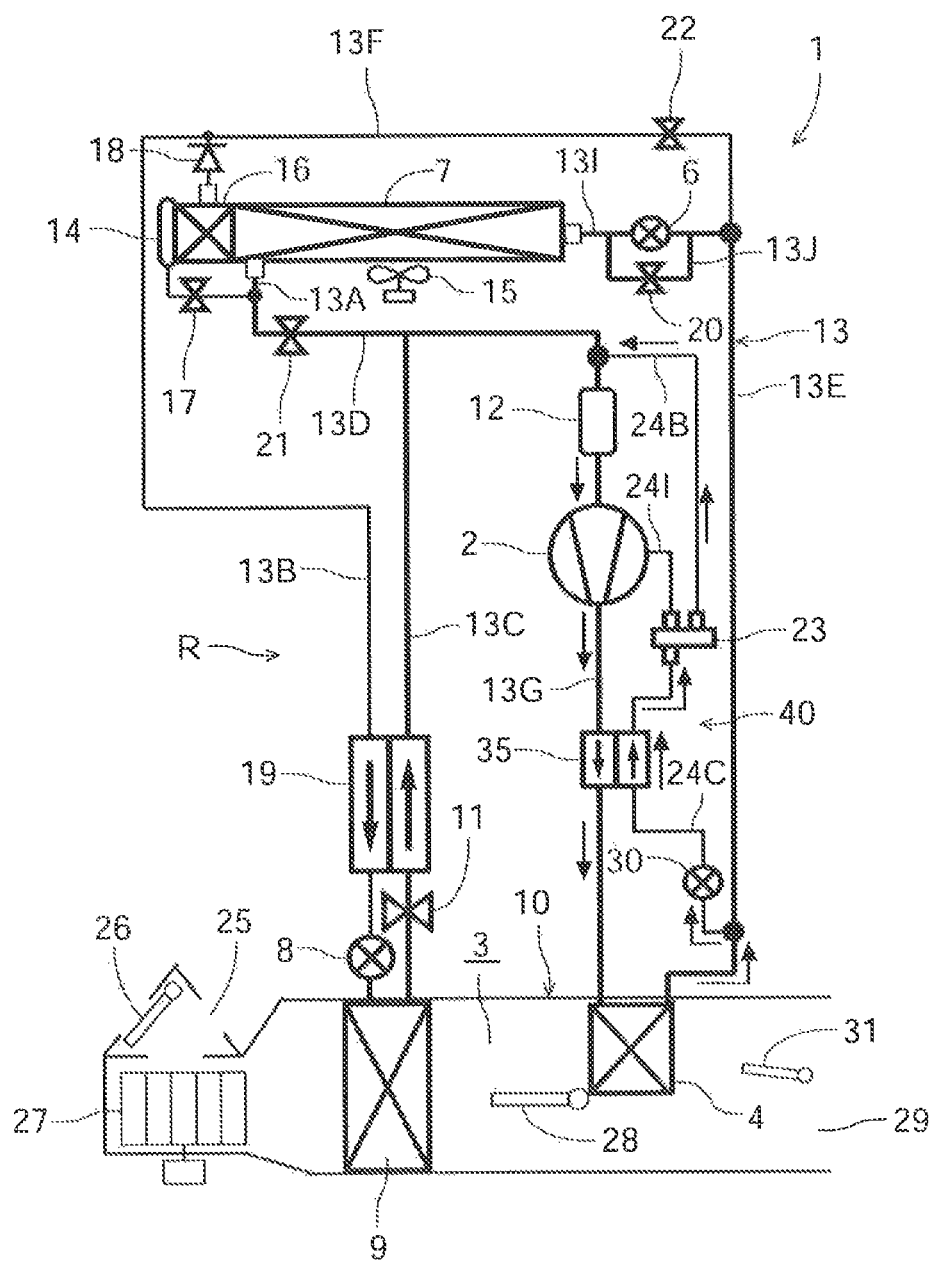
FIG. 9 is a view to explain a flow of the refrigerant of the vehicle air conditioner of FIG. 1 during bypassing of a bypass circuit.

When the outdoor expansion valve 6 and the solenoid valves 20 and 22 are closed in this manner, as shown by arrows in FIG. 9, all of the refrigerant flowing out from the radiator 4 to enter the refrigerant pipe 13E flows into the common circuit 24C of the return circuit 40, is decompressed by the return expansion valve 30, and then enters the discharge side heat exchanger 35, in which the refrigerant performs heat exchange with the discharged refrigerant of the compressor 2 (the refrigerant discharged from the compressor 2 before flowing into the radiator 4), and absorbs heat to evaporate.

Afterward, the gas refrigerant evaporated in the discharge side heat exchanger 35 reaches the three-way valve 23, and flows from the three-way valve 23 through the bypass circuit 24B to flow into the accumulator 12. The refrigerant is returned into the accumulator 12 in which gas liquid separation of the unevaporated refrigerant is performed, and the refrigerant is sucked into the compressor 2, compressed again, and discharged from the compressor 2 to the refrigerant pipe 13G (shown by arrows in FIG. 9).

That is, in this case, the high-temperature refrigerant discharged from the compressor 2 radiates heat in the radiator 4, and evaporates in the discharge side heat exchanger 35 to be sucked from the accumulator 12 into the compressor 2, thereby forming a short cycle, and hence heat is not pumped up from the outdoor air by the evaporation of the refrigerant in the outdoor heat exchanger 7. Therefore, in this case, the compressor 2 itself performs a function of a heater which heats the refrigerant.

The controller 32 controls a revolution number of the compressor 2 on the basis of a high pressure of the refrigerant circuit R which is detected by the discharge pressure sensor 42 or the radiator pressure sensor 47, also controls a valve position of the return expansion valve 30 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4. In consequence, the heating capability in the radiator 4 in this case can be acquired. Further, in this non-frost mode, all the refrigerant flowing out from the radiator 4 is returned from the bypass circuit 24B of the return circuit 40 to the accumulator 12, and hence the frost formation onto the outdoor heat exchanger 7 does not occur.

(7-1) Non-Frost Mode Executability Judgment 1

Next, one embodiment of an executability judgment of the non-frost mode to bypass the outdoor heat exchanger 7 by use of the bypass circuit 24B of the return circuit 40 will be described with reference to FIG. 8. In the heating mode, the outdoor heat exchanger 7 absorbs heat from the outdoor air to have a low temperature as described above, and hence water in the outdoor air forms frost to adhere to the outdoor heat exchanger 7. When this frost grows, the heat exchange between the outdoor heat exchanger 7 and the outdoor air to be passed is remarkably obstructed, to deteriorate an air conditioning performance. When the frost grows on the outdoor heat exchanger 7, the controller 32 executes the non-frost mode, and stops the inflow of the refrigerant into the outdoor heat exchanger 7 to obstruct the further growth of the frost.

Specifically, the controller 32 first estimates a frost formation condition of the outdoor heat exchanger 7. Next, an example of estimation of the frost formation condition of the outdoor heat exchanger 7 will be described with reference to FIG. 8. The controller 32 allows the estimation of the frost formation condition of the outdoor heat exchanger 7, when (i) is first established in frost formation condition estimation allowing conditions mentioned below and one of (ii) to (iv) is established.

[Frost Formation Condition Estimation Allowing Conditions]

(i) An operation mode is the heating mode.

(ii) The high pressure converges at a target value. Specifically, an example of this condition is a condition that there is continued for a predetermined time t1 (sec) a state where an absolute value of a difference (PCO−PCI) between the target radiator pressure PCO and the radiator pressure PCI is a predetermined value A or less.

(iii) A predetermined time t2 (sec) passes after the mode shifts to the heating mode.

(iv) A velocity variance is a predetermined value or less (an acceleration/deceleration speed of the vehicle is the predetermined value or less). The acceleration/deceleration speed of the vehicle is, for example, a difference (VSP−VSPz) between the current velocity VSP and a velocity VSPz of one second before.

The above conditions (ii) and (iii) are conditions to remove wrong estimation occurring in a transitional period of an operating status. Furthermore, also when the velocity noticeably varies, the wrong estimation occurs, and hence the above condition (iv) is added.

When the above frost formation condition estimation allowing conditions are established to allow the frost formation condition estimation, the controller 32 estimates the frost formation condition of the outdoor heat exchanger 7 on the basis of a current refrigerant evaporation temperature TXO of the outdoor heat exchanger 7 which is obtained from the outdoor heat exchanger pressure sensor 56 and a refrigerant evaporation temperature TXObase of the outdoor heat exchanger 7 in non-frosting when the outdoor air is a low humidity environment and the frost is not formed in the outdoor heat exchanger 7. The controller 32 in this case determines the refrigerant evaporation temperature TXObase of the outdoor heat exchanger 7 in non-frosting by use of the following equation (IV).

$$TXObase = f(Tam, NC, BLV, VSP) \quad (IV)$$
$$= k1 \times Tam + k2 \times NC + k3 \times BLV + k4 \times VSP$$

Here, as to parameters of Equation (IV), Tam is an outdoor temperature obtained from the outdoor temperature sensor 33, NC is a revolution number of the compressor 2, BLV is a blower voltage of the indoor blower 27, VSP is a velocity obtained from the velocity sensor 52, and k1 to k4 are coefficients which are obtained beforehand by experiments.

The above outdoor temperature Tam is an index indicating a suction air temperature of the outdoor heat exchanger 7, and there is a tendency that the lower the outdoor temperature Tam (the suction air temperature of the outdoor heat exchanger 7) is, the lower the temperature TXObase becomes. Therefore, the coefficient k1 is a positive value. It is to be noted that the index indicating the suction air temperature of the outdoor heat exchanger 7 is not limited to the outdoor temperature Tam.

In addition, the above revolution number NC of the compressor 2 is an index indicating the refrigerant flow rate in the refrigerant circuit R, and there is a tendency that the higher the revolution number NC is (the larger the refrigerant flow rate is), the lower the temperature TXObase becomes. Therefore, the coefficient k2 is a negative value.

In addition, the above blower voltage BLV is an index indicating a passing air volume of the radiator 4, and there is a tendency that the higher the blower voltage BLV is (the larger a passing air volume of the radiator 4 is), the lower the temperature TXObase becomes. Therefore, the coefficient k3 is a negative value. It is to be noted that the index indicating the passing air volume of the radiator 4 is not limited to this example, and may be a blower air volume of the indoor blower 27 or an opening SW of the air mix damper 28.

In addition, the above velocity VSP is an index indicating a passing air speed of the outdoor heat exchanger 7, and there is a tendency that the lower the velocity VSP is (the lower the passing air speed of the outdoor heat exchanger 7 is), the lower the temperature TXObase becomes. Therefore, the coefficient k4 is a positive value. It is to be noted that the index indicating the passing air speed of the outdoor heat exchanger 7 is not limited to this example, and may be a voltage of the outdoor blower 15.

It is to be noted that in the embodiment, as the parameters of Equation (IV), the outdoor temperature Tam, the revolution number NC of the compressor 2, the blower voltage BLV of the indoor blower 27 and the velocity VSP are used, but a load of the vehicle air conditioner 1 may be added as a parameter to these parameters. It is considered that examples of an index indicating this load include the target outlet temperature TAO, the revolution number NC of the compressor 2, the blower air volume of the indoor blower 27, an inlet air temperature of the radiator 4, and the radiator temperature Tci of the radiator 4, and there is a tendency that the larger the load is, the lower the temperature TXObase becomes. Furthermore, aging deterioration of the vehicle (the number of driving years or the number of driving times) may be added to the parameters. In addition, the parameters of Equation (IV) are not limited to all of the above parameters, and one of the parameters or any combination of the parameters may be used.

Next, the controller 32 calculates a difference ΔTXO (ΔTXO=TXObase−TXO) between the refrigerant evaporation temperature TXObase in non-frosting which is obtained by substituting respective current parameter values into Equation (IV) and the current refrigerant evaporation temperature TXO, and the controller judges that the frost is to be formed in the outdoor heat exchanger 7 when there is continued for a predetermined time t1 (sec) or more a state where the refrigerant evaporation temperature TXO is lower than the refrigerant evaporation temperature TXObase in non-frosting and the difference ΔTXO is a predetermined frost formation detecting threshold 1 or more.

Figure 8:
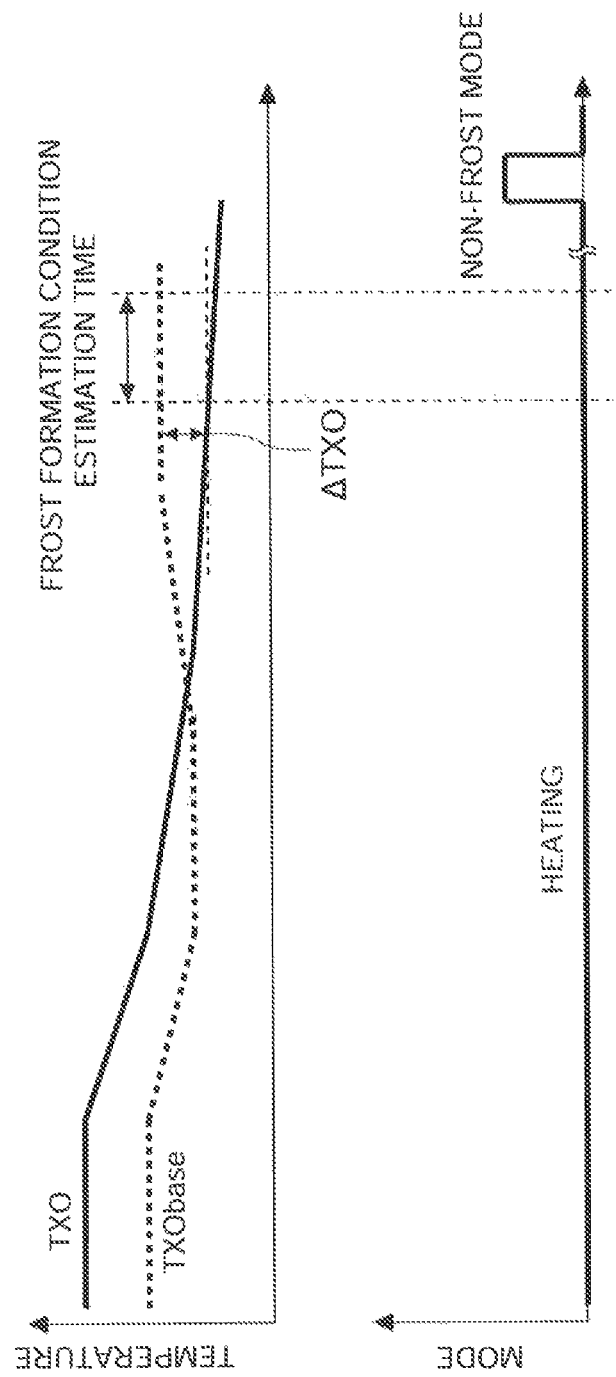
FIG. 8 is a timing chart to explain a frost formation condition estimating operation of an outdoor heat exchanger by the controller of FIG. 2.

In FIG. 8, a solid line shows a change of the refrigerant evaporation temperature TXO of the outdoor heat exchanger 7, and a broken line shows a change of the refrigerant evaporation temperature TXObase in non-frosting. In the beginning of an operation start, the refrigerant evaporation temperature TXO of the outdoor heat exchanger 7 is high and is in excess of the refrigerant evaporation temperature TXObase in non-frosting. The interior temperature is raised accompanying progress of the heating mode, and the load of the vehicle air conditioner 1 lowers, and hence the above-mentioned refrigerant flow rate or the passing air volume of the radiator 4 also lowers, and TXObase (the broken line of FIG. 8) calculated in accordance with Equation (IV) rises. On the other hand, when the frost formation starts to occur in the outdoor heat exchanger 7, a heat exchange performance with the outdoor air worsens little by little, so that the refrigerant evaporation temperature TXO (the solid line) gradually drops and then falls below TXObase. Then, the drop of the refrigerant evaporation temperature TXO further proceeds, and the difference ΔTXO (TXObase−TXO) reaches the frost formation detecting threshold 1 or more. Furthermore, when this state is continued for the predetermined time t1 or more, the controller 32 judges a frost formation estimating first stage.

When it is judged that the frost formation condition of the outdoor heat exchanger 7 is the frost formation condition estimating first stage, the controller 32 judges that there is a high risk that the frost formation occurs in the outdoor heat exchanger 7 from now on, and executes a predetermined frost formation suppressing operation. It is considered that this frost formation suppressing operation includes the lowering of the revolution number of the compressor 2, the lowering of the passing air volume of the radiator 4 by the indoor blower 27, the raising of the refrigerant subcool degree of the radiator 4 by the reduction of the valve position of the outdoor expansion valve 6 and the like, or any combination of these operations. In consequence, the refrigerant evaporation pressure of the outdoor heat exchanger 7 which is the low pressure-side pressure rises, and hence the frost formation to the outdoor heat exchanger 7 is suppressed.

When the frost formation to the outdoor heat exchanger 7 proceeds even by such a frost formation suppressing operation, the difference ΔTXO(TXObase−TXO) is the frost formation detecting threshold 2 or more which is larger than the frost formation detecting threshold 1 and this state is continued for a predetermined time t2 or more, the controller 32 judges a frost formation condition estimating second stage. When it is judged that the frost formation condition of the outdoor heat exchanger 7 is the frost formation condition estimating second stage, the controller 32 judges that the frost formation to the outdoor heat exchanger 7 is predicted, shuts off the outdoor expansion valve 6, closes the respective solenoid valves including the solenoid valves 20 and 22, and switches the three-way valve 23 so that the refrigerant flows to the side of the bypass circuit 24B, to execute the non-frost mode. Afterward, the valve position control of the return expansion valve 30 is performed as described above.

By this bypassing of the outdoor heat exchanger 7, the frost formation to the outdoor heat exchanger 7 or the further growth of the frost formation is prevented, and the heating capability in the vehicle interior can be exerted without a hindrance by the refrigerant returned to the accumulator 12.

It is to be noted that in the above embodiment, the refrigerant evaporation temperature TXO of the outdoor heat exchanger 7 is employed to estimate the frost formation condition, but the present invention is not limited to this embodiment, and the frost formation condition of the outdoor heat exchanger 7 may be estimated on the basis of a current refrigerant evaporation pressure PXO of the outdoor heat exchanger 7 which is obtained from the outdoor heat exchanger outdoor heat exchanger temperature sensor 54, and a refrigerant evaporation pressure PXObase of the outdoor heat exchanger 7 in non-frosting when the outdoor air is a low humidity environment and the frost is not formed in the outdoor heat exchanger 7.

Furthermore, frost formation condition estimating means is not limited to these examples, and the controller 32 may estimate the frost formation condition of the outdoor heat exchanger 7 on the basis of a zero point temperature and the refrigerant evaporation temperature of the outdoor heat exchanger 7 which are detected by the outdoor temperature sensor 33 and the outdoor humidity sensor 34.

When the frost formation condition of the outdoor heat exchanger 7 is estimated and the frost formation is predicted or the frost formation occurs in this manner, the frost formation to the outdoor heat exchanger 7 can be obstructed by bypassing the outdoor heat exchanger 7 and returning the refrigerant to the accumulator 12 by the bypass circuit 24B of the return circuit 40. In consequence, it is possible to avoid the worsening of the air condition in the vehicle interior due to the frost formation and to achieve the improvement of the heating capability by the radiator 4.

Additionally, in the stage before the bypass circuit 24B is operated, the controller 32 executes the operation to suppress the frost formation of the outdoor heat exchanger 7, and hence defrosting can be avoided as much as possible, and the worsening of the air condition in the vehicle interior can effectively be avoided.

(7-2) Non-Frost Mode Executability Judgment 2

In addition, when an external power source (a charger) is connected to the car and a preliminary heating operation is instructed, the controller 32 executes the non-frost mode. In an electric car or a hybrid car having a plug-in function, a battery can be charged from the external power source when the car is stopped. In this case, the controller 32 has a function of operating the compressor 2 when preliminary heating is instructed by a user before leaving a garage (the compressor 2 is operated by power supply from the battery or power supply directly from the external power source).

In such a case, the controller 32 executes the above non-frost mode, and passes all the refrigerant flowing out from the radiator 4 through the return circuit 40, whereby the refrigerant flows from the bypass circuit 24B into the accumulator 12. In consequence, the frost formation to the outdoor heat exchanger 7 in such a preliminary operation is prevented.

According to this embodiment, the controller 32 has the non-frost mode in which the refrigerant flowing out from the radiator 4 is passed through the bypass circuit 24B of the return circuit 40, and does not flow through the outdoor heat exchanger 7, but flows into the accumulator 12, and hence the refrigerant flowing into the outdoor heat exchanger 7 can be obstructed by passing the refrigerant flowing out from the radiator 4 through the accumulator 12 by use of the bypass circuit 24B.

In consequence, the frost formation to the outdoor heat exchanger 7 can be prevented, and the refrigerant flowing into the accumulator 12 is compressed by the compressor 2 again and discharged to the radiator 4, so that it is possible to prevent or inhibit deterioration of the heating capability by the radiator 4.

In particular, when the controller 32 estimates the frost formation condition to the outdoor heat exchanger 7 and the frost is generated in the outdoor heat exchanger 7 or the frost formation to the outdoor heat exchanger 7 is predicted, the frost formation to the outdoor heat exchanger 7 can accurately be prevented or inhibited by passing the refrigerant through the bypass circuit 24B of the return circuit 40.

Additionally, in the hybrid car or the electric car in which so-called plug-in to charge the battery from the external power source is possible, when the external power source supplies the power to the compressor 2 or the battery to drive the compressor 2, the controller 32 passes the refrigerant through the bypass circuit 24B of the return circuit 40. Therefore, by the external power source or the battery to be charged from the external power source, the compressor 2 is operated to pass the refrigerant through the bypass circuit 24B, so that the preliminary heating can be performed before leaving the garage and in that regard, the frost formation to the outdoor heat exchanger 7 can be prevented or inhibited.

In addition, there are disposed the return expansion valve 30 to decompress the refrigerant flowing through the bypass circuit 24B, and the discharge side heat exchanger 35 to perform heat exchange between the refrigerant decompressed by the return expansion valve 30 and the refrigerant discharged from the compressor 2 before flowing into the radiator 4, so that the refrigerant flowing through the bypass circuit 24B can be evaporated in the discharge side heat exchanger 35 and liquid compression in the compressor 2 can be prevented.

In particular, the controller 32 controls the subcool degree of the refrigerant in the outlet of the radiator 4 by the return expansion valve 30, when passing the refrigerant through the bypass circuit 24B, so that it is possible to acquire the heating capability without a hindrance in the radiator 4, when passing the refrigerant through the bypass circuit 24B.

In addition, the vehicle air conditioner 1 of the embodiment includes the injection circuit 24I of the return circuit 40 which distributes a part of the refrigerant flowing out from the radiator 4 to return the part to the middle of the compression by the compressor 2. Therefore, when the frost formation is predicted, the frost formation to the outdoor heat exchanger 7 can be inhibited by performing the gas injection to the compressor 2 by the injection circuit 24I. In consequence, it is possible to avoid worsening air condition in the vehicle interior due to the frost formation and to achieve the improvement of the heating capability by the radiator 4.

In this case, there are disposed the return expansion valve 30 to decompress the refrigerant flowing through the injection circuit 24I, and the discharge side heat exchanger 35 to perform the heat exchange between the refrigerant decompressed by the return expansion valve 30 and the refrigerant discharged from the compressor 2 before flowing into the radiator 4, and hence the refrigerant to be returned to the middle of the compression of the compressor 2 by the injection circuit 24I can perform the heat exchange with the discharged refrigerant of the compressor 2 which has a higher temperature than the refrigerant flowing out from the radiator 4, to evaporate. In consequence, the amount of the gas to be injected to the compressor 2 is sufficiently acquired and the amount of the refrigerant to be discharged from the compressor 2 is increased, so that the improvement of the heating capability can be achieved.

In addition, the controller 32 controls the superheat degree of the refrigerant returning to the compressor 2 by the return expansion valve 30, when passing the refrigerant through the injection circuit 24I, and hence it is possible to avoid the inflow of the liquid refrigerant to the middle of the compression by the compressor 2 and to safely realize the gas injection.

Additionally, in this embodiment, the bypass circuit 24B and the injection circuit 24I form the common circuit 24C on the upstream side of the refrigerant, the return expansion valve 30 and the discharge side heat exchanger 35 are disposed in the common circuit 24C, and the bypass circuit 24B and the injection circuit 24I are branched in the three-way valve 23 positioned on the downstream side of the discharge side heat exchanger 35. Therefore, the return expansion valve 30 and the discharge side heat exchanger 35 can be used by both the bypass circuit 24B and the injection circuit 24I, and it is possible to achieve the decrease of the number of components.

(8-1) Example 1 of Return Circuit

Figure 10:
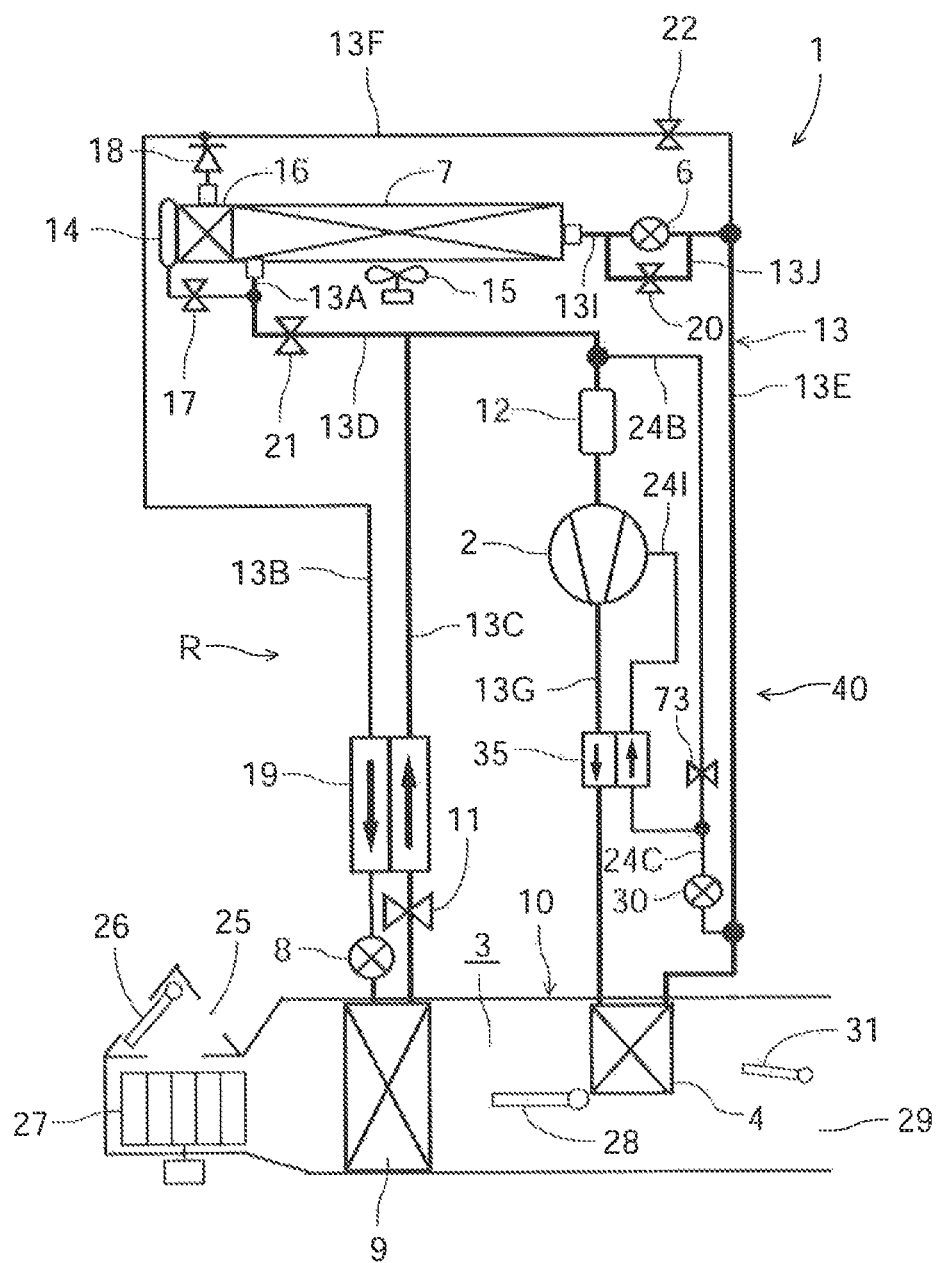
FIG. 10 is a constitutional view of a vehicle air conditioner of another embodiment to which the present invention is applied.
Figure 11:
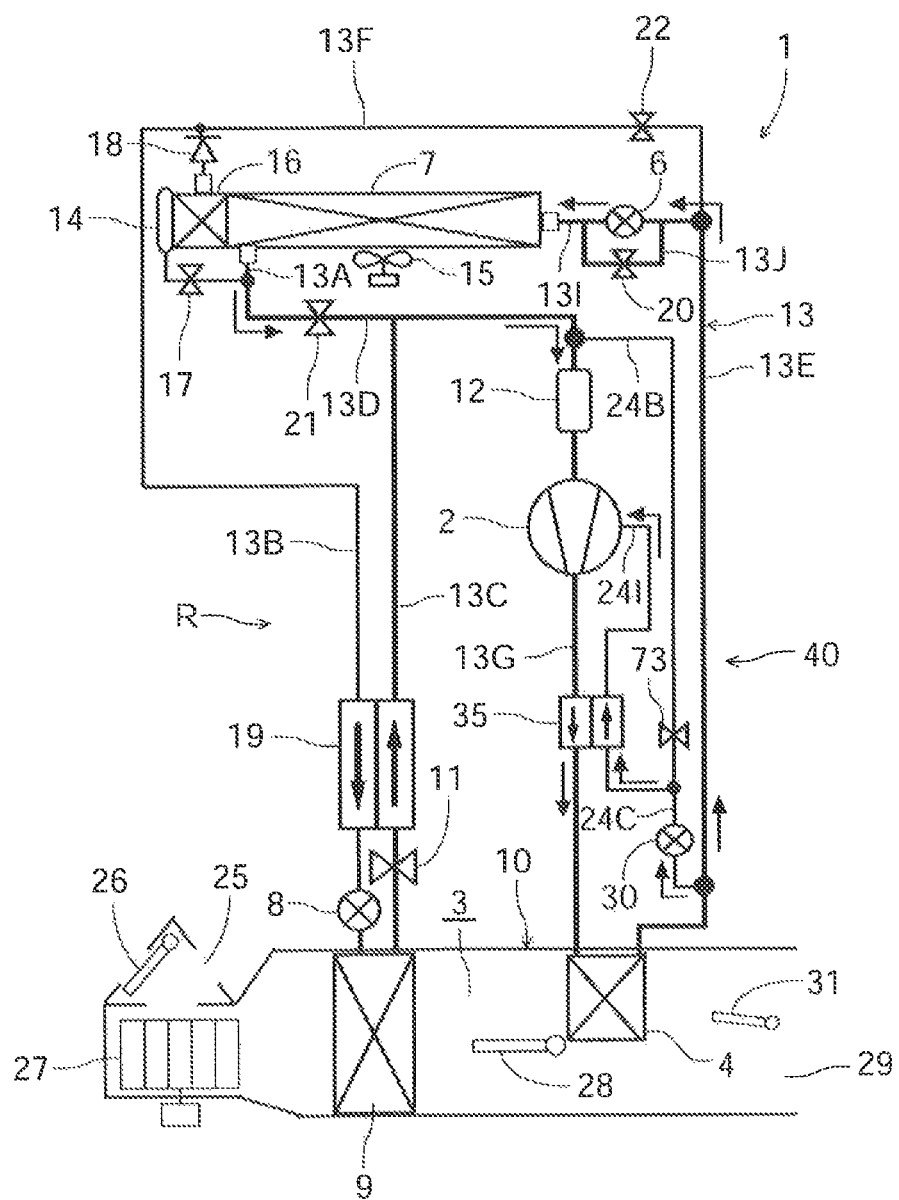
FIG. 11 is a view to explain a flow of a refrigerant of the vehicle air conditioner of FIG. 10 during gas injection by an injection circuit.
Figure 12:
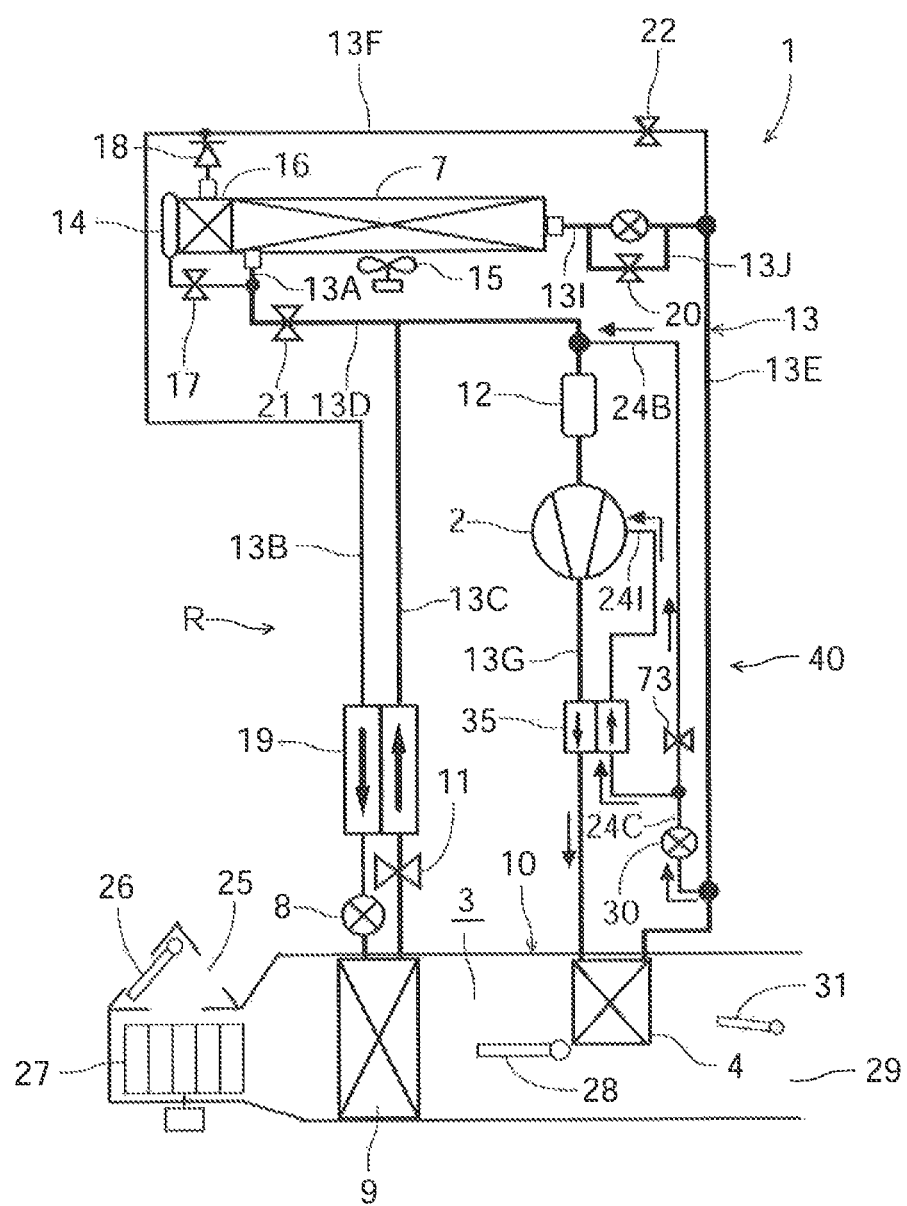
FIG. 12 is a view to explain a flow of the refrigerant of the vehicle air conditioner of FIG. 10 when the gas injection by the injection circuit and bypassing of a bypass circuit are simultaneously performed.

Next, each of FIG. 10 to FIG. 12 shows another constitutional view of the vehicle air conditioner 1 of the present invention. In this embodiment, the three-way valve 23 of FIG. 1 is not disposed, and a common circuit 24C, in which a return expansion valve 30 is disposed, is first branched to one end of an injection circuit 24I and one end of a bypass circuit 24B, a discharge side heat exchanger 35 is disposed in the injection circuit 24I, and a solenoid valve 73 is attached to the bypass circuit 24B. Further, the other end of the bypass circuit 24B is connected to an inlet of an accumulator 12 in the same manner as in FIG. 1, and the other end of the injection circuit 24I communicates to be connected to middle of the compression by a compressor 2. The other constitution is similar to the case of FIG. 1, and components denoted with the same reference numerals produce the same or similar functions.

In this embodiment, the common circuit 24C, the return expansion valve 30, the discharge side heat exchanger 35, the injection circuit 24I, the solenoid valve 73 and the bypass circuit 24B constitute a return circuit 40. Additionally, in the return circuit 40, the common circuit 24C, the return expansion valve 30, the discharge side heat exchanger 35 and the injection circuit 24I constitute an injection circuit of the present invention, and the common circuit 24C, the return expansion valve 30, the solenoid valve 73 and the bypass circuit 24B constitute a bypass circuit of the present invention from a refrigerant outlet side of a radiator 4 to an inlet side of the accumulator 12.

According to such a constitution, the return circuit 40 can be constituted without using the abovementioned three-way valve, which becomes inexpensive. In addition, when gas injection is performed by the injection circuit 24I, the solenoid valve 73 is closed. Further, as shown by arrows in FIG. 11, a part of a refrigerant flowing out from the radiator 4 is decompressed by the return expansion valve 30, evaporated in the discharge side heat exchanger 35 and returned to information middle of the compression by the compressor 2. Valve position control of the return expansion valve 30 at this time is similar to the abovementioned control.

In addition, when a non-frost mode is executed in which the refrigerant bypassing an outdoor heat exchanger 7 by use of the bypass circuit 24B and flowing out from the radiator 4 is returned to the accumulator 12, an outdoor expansion valve 6 and solenoid valves 20 and 22 are closed in the same manner as described above. Further, the solenoid valve 73 is opened. In consequence, all the refrigerant flowing out from the radiator 4 is decompressed by the return expansion valve 30 as shown by an arrow in FIG. 12, flows through the solenoid valve 73 and the bypass circuit 24B, and flows into the accumulator 12. In this case, the refrigerant flowing through the bypass circuit 24B into the accumulator 12 evaporates in the accumulator 12.

Furthermore, the refrigerant is returned to the accumulator 12 in which gas liquid separation of the unevaporated refrigerant is performed, and the refrigerant is sucked into the compressor 2, compressed again, and discharged from the compressor 2 to a refrigerant pipe 13G. Additionally, in this embodiment, as shown in FIG. 12, the refrigerant also flows through the injection circuit 24I as long as the return expansion valve 30 is opened, and hence the gas injection is also performed simultaneously with the bypassing to the accumulator 12.

When such a mode to pass the refrigerant flowing out from the radiator 4 through both the bypass circuit 24B and the injection circuit 24I is disposed in a controller 32, the gas injection can be performed by passing the refrigerant flowing out from the radiator 4 through the injection circuit 24I while passing the refrigerant through the bypass circuit 24B, and it is possible to effectively realize both prevention or inhibition of frost formation to the outdoor heat exchanger 7 and improvement of a heating capability of the radiator 4.

(8-2) Example 2 of Return Circuit

Next, each of FIG. 13 to FIG. 16 shows still another constitutional view of the vehicle air conditioner 1 of the present invention. In this embodiment, the common circuit 24C and the return expansion valve 30 of the above embodiment are not disposed, and one end of an injection circuit 24I and one end of a bypass circuit 24B are branched from a refrigerant pipe 13E just extended out from a radiator 4 (before branched to refrigerant pipes 13F and 13I). Further, a solenoid valve 71 and a mechanical expansion valve 80 are attached to the injection circuit 24I, and a temperature sensing portion 80S of the expansion valve 80 is attached to the injection circuit 24I on an outlet side of a discharge side heat exchanger 35.

In addition, a solenoid valve 74 is attached to the bypass circuit 24B. As the solenoid valve 74 in this case, a valve having a small diameter is employed. Further, the other end of the bypass circuit 24B is similarly connected to an inlet of an accumulator 12, and the other end of the injection circuit 24I communicates to be connected to the middle of the compression by a compressor 2. The other constitution is similar to the case of FIG. 1, and components denoted with the same reference numerals produce the same or similar functions.

In this embodiment, the solenoid valve 71, the expansion valve 80, the discharge side heat exchanger 35, the injection circuit 24I, the solenoid valve 74 and the bypass circuit 24B constitute a return circuit 40. Additionally, in this return circuit 40, the injection circuit 24I having the solenoid valve 71, the expansion valve 80 and the discharge side heat exchanger 35 constitutes an injection circuit of the present invention, and the bypass circuit 24B having the solenoid valve 74 constitutes a bypass circuit of the present invention from the refrigerant outlet side of the radiator 4 to an inlet side of the accumulator 12.

According to such a constitution, the return circuit 40 can be constituted without using such an electric expansion valve as described above (the expansion valve 30), which is inexpensive. In addition, when gas injection is performed by the injection circuit 24I, the solenoid valve 71 is opened and the solenoid valve 74 is closed. Further, as shown by arrows in FIG. 14, a part of the refrigerant flowing out from the radiator 4 is decompressed by the expansion valve 80, evaporated in the discharge side heat exchanger 35 and then returned to the middle of the compression by the compressor 2. At this time, the expansion valve 80 operates so that a superheat degree of the refrigerant flowing out from the discharge side heat exchanger 35, which is detected by the temperature sensing portion 80S, is adjusted to be constant.

In addition, when a non-frost mode is executed in which the refrigerant bypassing an outdoor heat exchanger 7 by use of the bypass circuit 24B and flowing out from the radiator 4 is returned to the accumulator 12, an outdoor expansion valve 6 and solenoid valves 20 and 22 are closed in the same manner as described above. Further, the solenoid valve 74 is opened and the solenoid valve 71 is closed. In consequence, all the refrigerant flowing out from the radiator 4 flows through the solenoid valve 74 and the bypass circuit 24B and flows into the accumulator 12 as shown by arrows in FIG. 15. In this case, the solenoid valve 74 has a small diameter, and hence the refrigerant is squeezed in a process of passing the solenoid valve 74 and evaporates in the accumulator 12.

Further, the refrigerant is returned to the accumulator 12 in which gas liquid separation of the unevaporated refrigerant is performed, and the refrigerant is sucked into the compressor 2, compressed again, and discharged from the compressor 2 to a refrigerant pipe 13G. Additionally, in this embodiment, when the solenoid valve 71 is opened, the refrigerant also flows through the injection circuit 24I, and hence the gas injection is also performed simultaneously with the bypassing to the accumulator 12.

Furthermore, in this embodiment, the solenoid valve 74 having a small diameter is used, and hence the refrigerant also flows through the outdoor heat exchanger 7 by opening the outdoor expansion valve 6. That is, as shown by arrows in FIG. 16, the refrigerant flowing out from the radiator 4 can be passed through the bypass circuit 24B and also passed through the injection circuit 24I while passing the refrigerant through the outdoor expansion valve 6 and the outdoor heat exchanger 7.

When such a mode to pass the refrigerant flowing out from the radiator 4 through the outdoor heat exchanger 7, the bypass circuit 24B and the injection circuit 24I is disposed in a controller 32, the refrigerant can be passed through both the bypass circuit 24B and the injection circuit 24I and additionally, heat pumped up from outdoor air can be utilized in heating.

(8-3) Example 3 of Return Circuit

Figure 17:
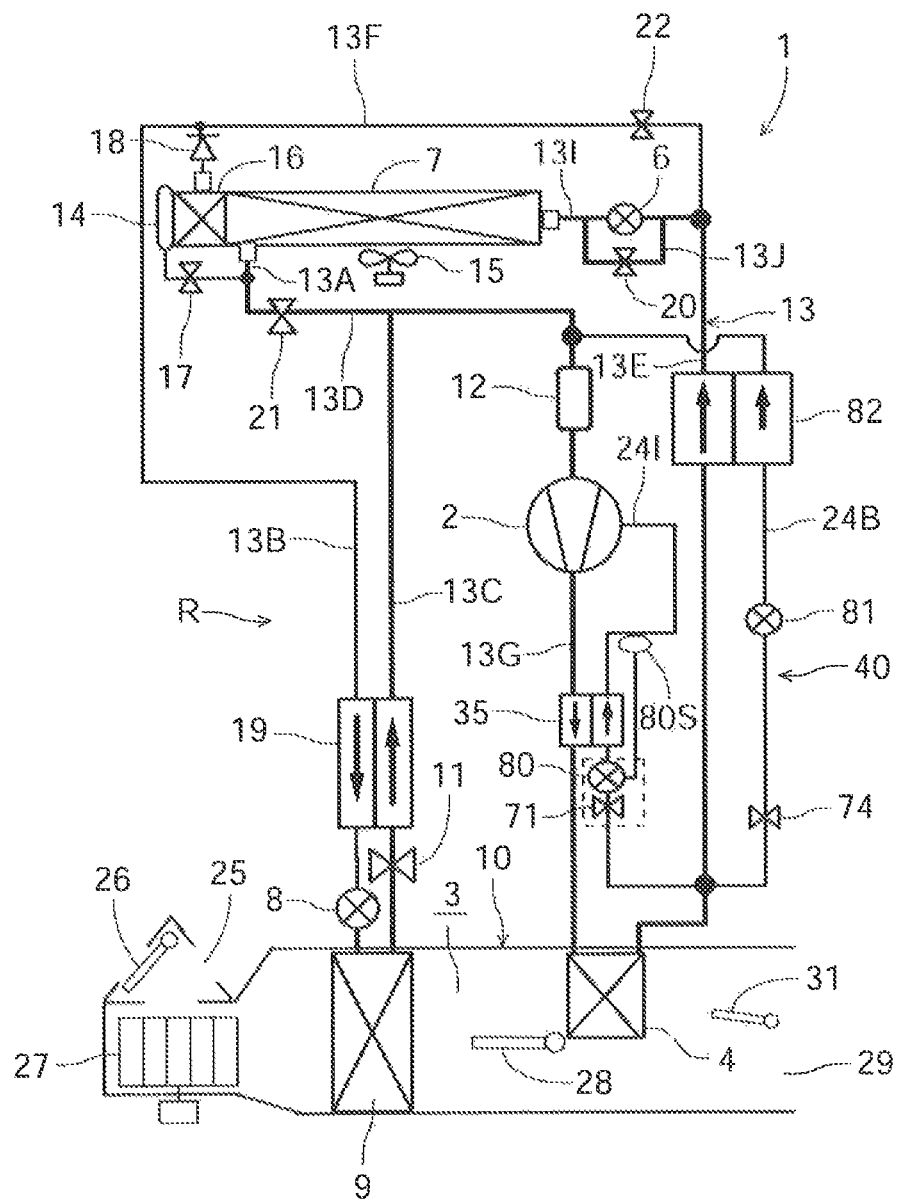
FIG. 17 is a constitutional view of a vehicle air conditioner of a further embodiment to which the present invention is applied.

Next, FIG. 17 shows a further constitutional view of the vehicle air conditioner 1 of the present invention. In this embodiment, in addition to a solenoid valve 74, a bypass expansion valve 81 constituted of an electric valve is attached to a bypass circuit 24B in the embodiment of FIG. 13. Therefore, the solenoid valve 74 in this case may have a usual diameter.

In addition, the bypass circuit 24B on a downstream side of the bypass expansion valve 81 is disposed in a heat exchange relation with a refrigerant pipe 13E immediately after extended from a radiator 4, and both the circuit and the pipe constitute a bypass heat exchanger 82. The other constitution is similar to the case of FIG. 13.

Therefore, in this embodiment, a solenoid valve 71, an expansion valve 80, a discharge side heat exchanger 35, an injection circuit 24I, the solenoid valve 74, the bypass expansion valve 81, the bypass heat exchanger 82 and the bypass circuit 24B constitute a return circuit 40. Additionally, in the return circuit 40, the injection circuit 24I having the solenoid valve 71, the expansion valve 80 and the discharge side heat exchanger 35 constitute an injection circuit of the present invention, and the bypass circuit 24B having the solenoid valve 74, the bypass expansion valve 81 and the bypass heat exchanger 82 constitute a bypass circuit of the present invention from a refrigerant outlet side of the radiator 4 to an inlet side of an accumulator 12.

Figure 13:
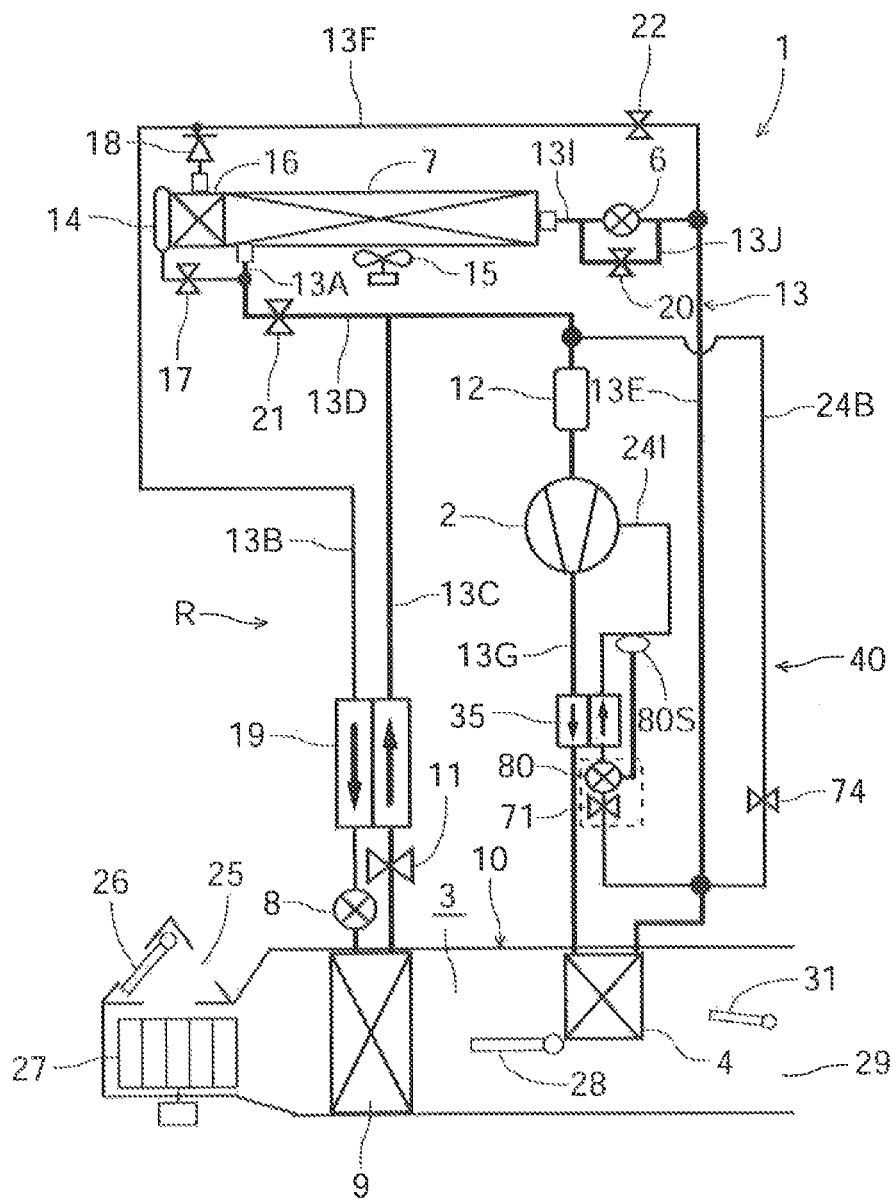
FIG. 13 is a constitutional view of a vehicle air conditioner of still another embodiment to which the present invention is applied.
Figure 14:
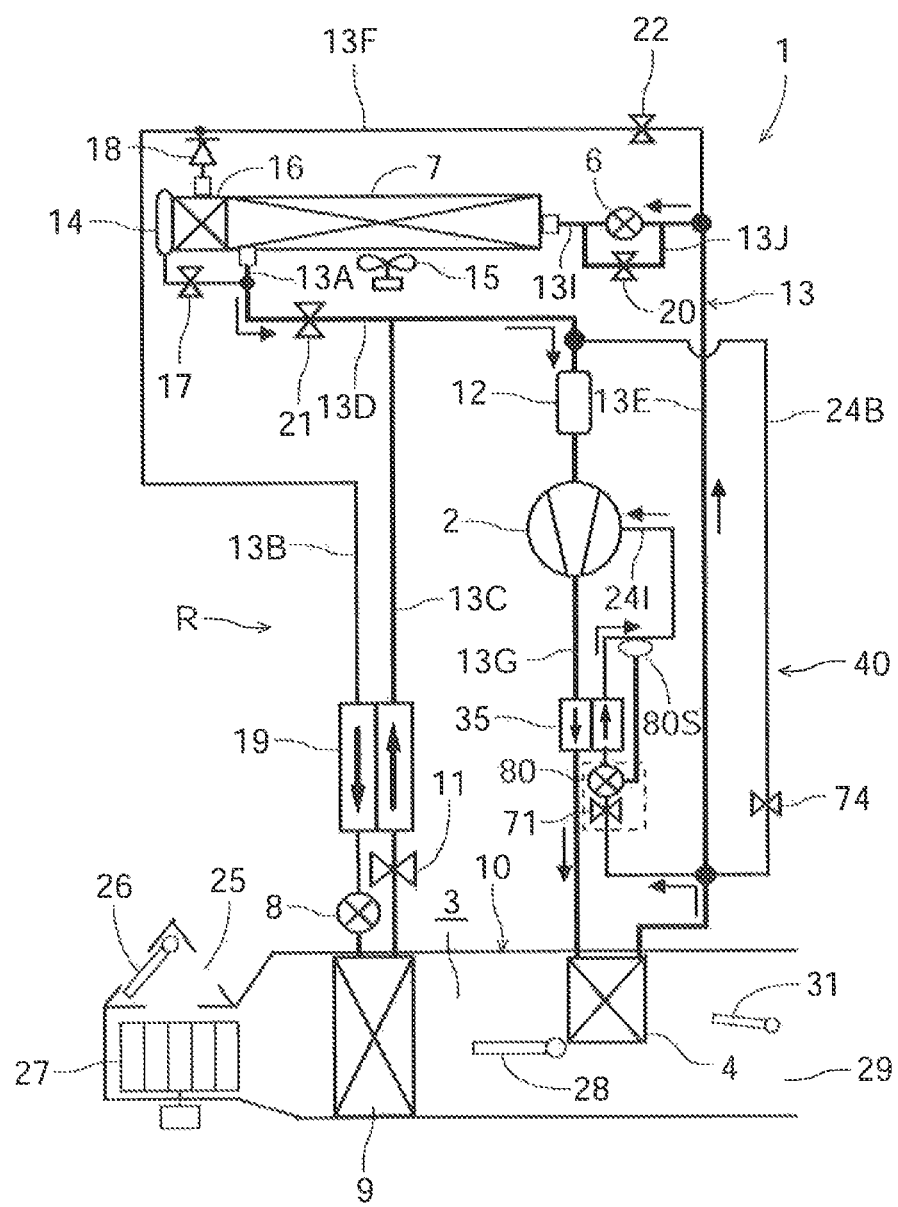
FIG. 14 is a view to explain a flow of a refrigerant of the vehicle air conditioner of FIG. 13 during gas injection by an injection circuit.
Figure 15:
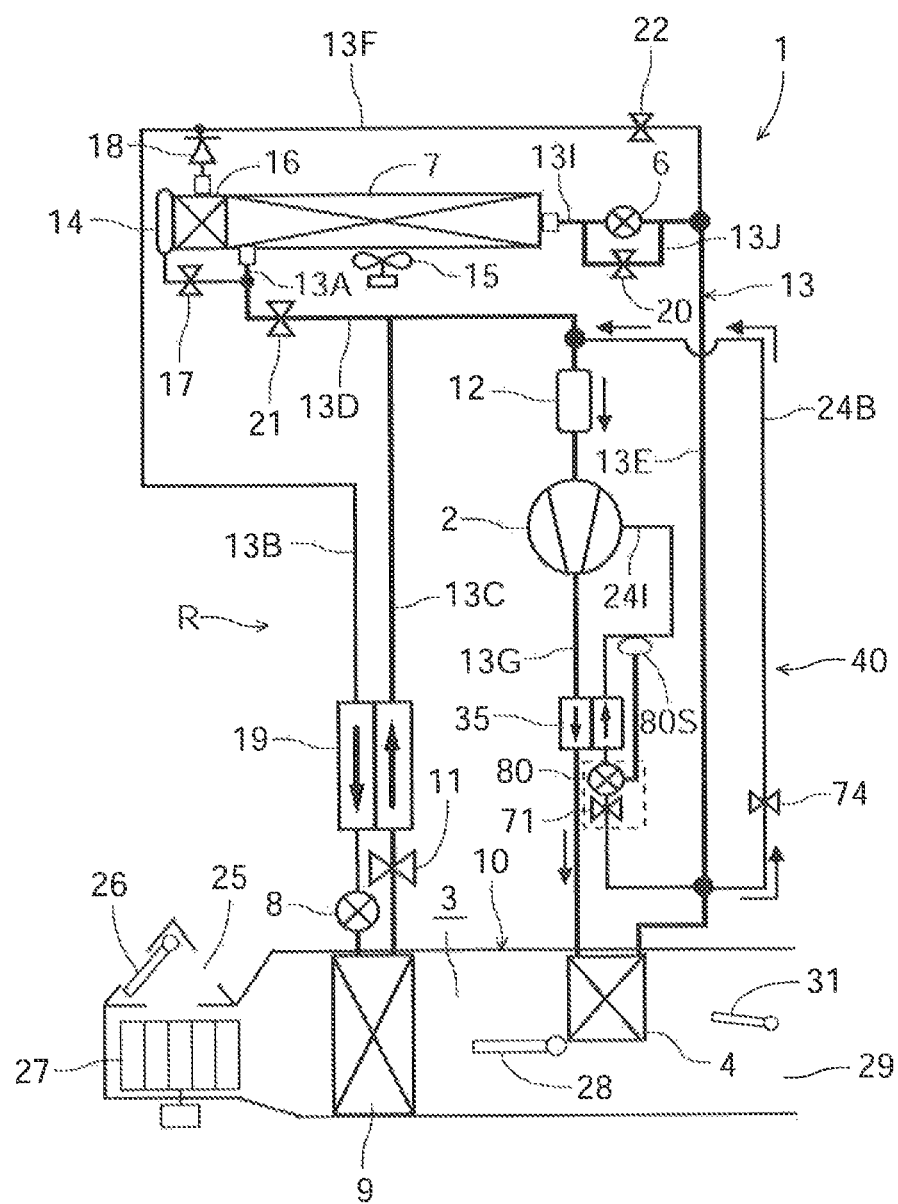
FIG. 15 is a view to explain a flow of the refrigerant of the vehicle air conditioner of FIG. 13 when the gas injection by the injection circuit and bypassing of a bypass circuit are simultaneously performed.
Figure 16:
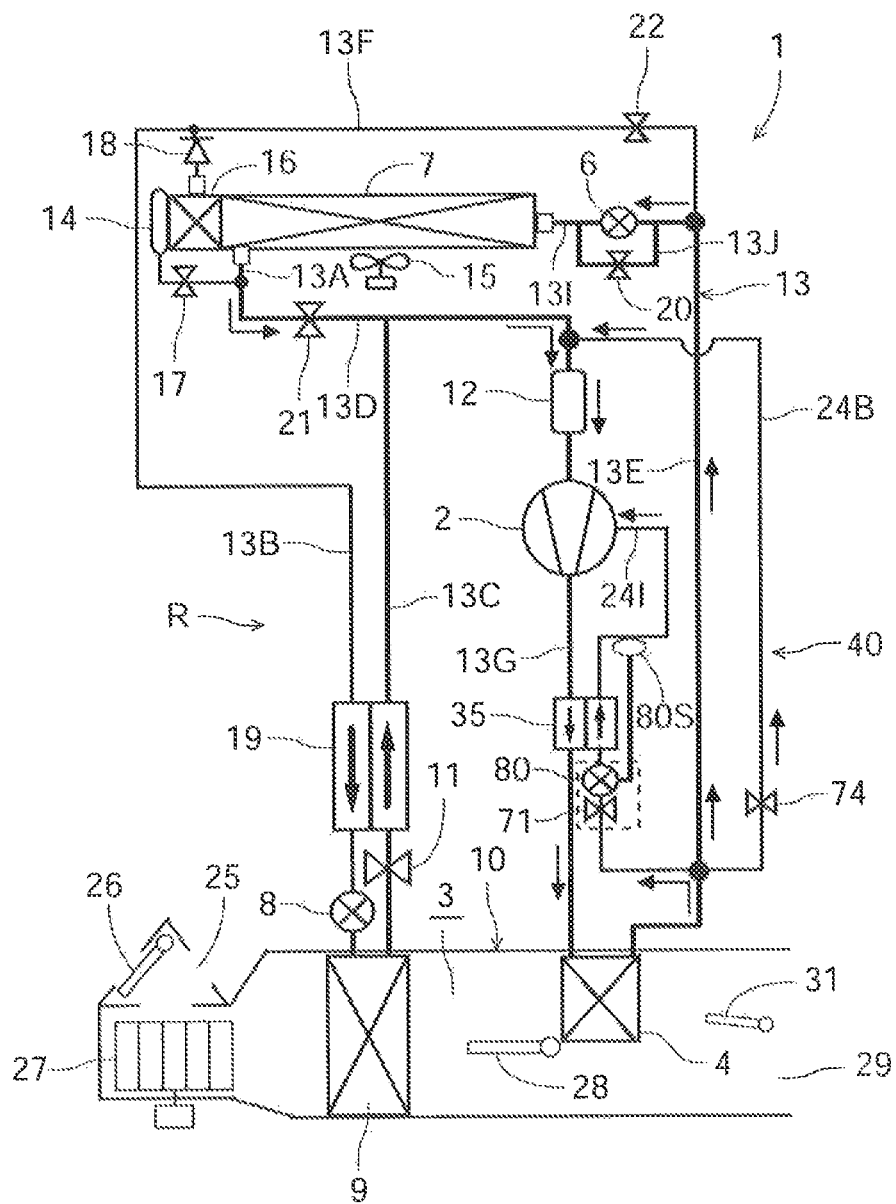
FIG. 16 is a view to explain a flow of the refrigerant of the vehicle air conditioner of FIG. 13 when there are simultaneously performed the gas injection by the injection circuit, the bypassing of the bypass circuit and supplying of the refrigerant to an outdoor heat exchanger.

According to such a constitution, in addition to the effect of FIG. 13, when a non-frost mode is executed in which a part of a refrigerant bypasses an outdoor heat exchanger 7 by use of the bypass circuit 24B while flowing through the outdoor heat exchanger and the refrigerant flowing out from the radiator 4 is returned to the accumulator 12, the refrigerant flowing into the bypass circuit 24B is squeezed by the bypass expansion valve 81, performs heat exchange with the refrigerant flowing through the refrigerant pipe 13E to evaporate in the bypass heat exchanger 82, and then flows into the accumulator 12. Therefore, liquid compression of a compressor 2 can be prevented, and the refrigerant flowing toward an outdoor expansion valve 6 can be subcooled.

(8-4) Example 4 of Return Circuit

Figure 18:
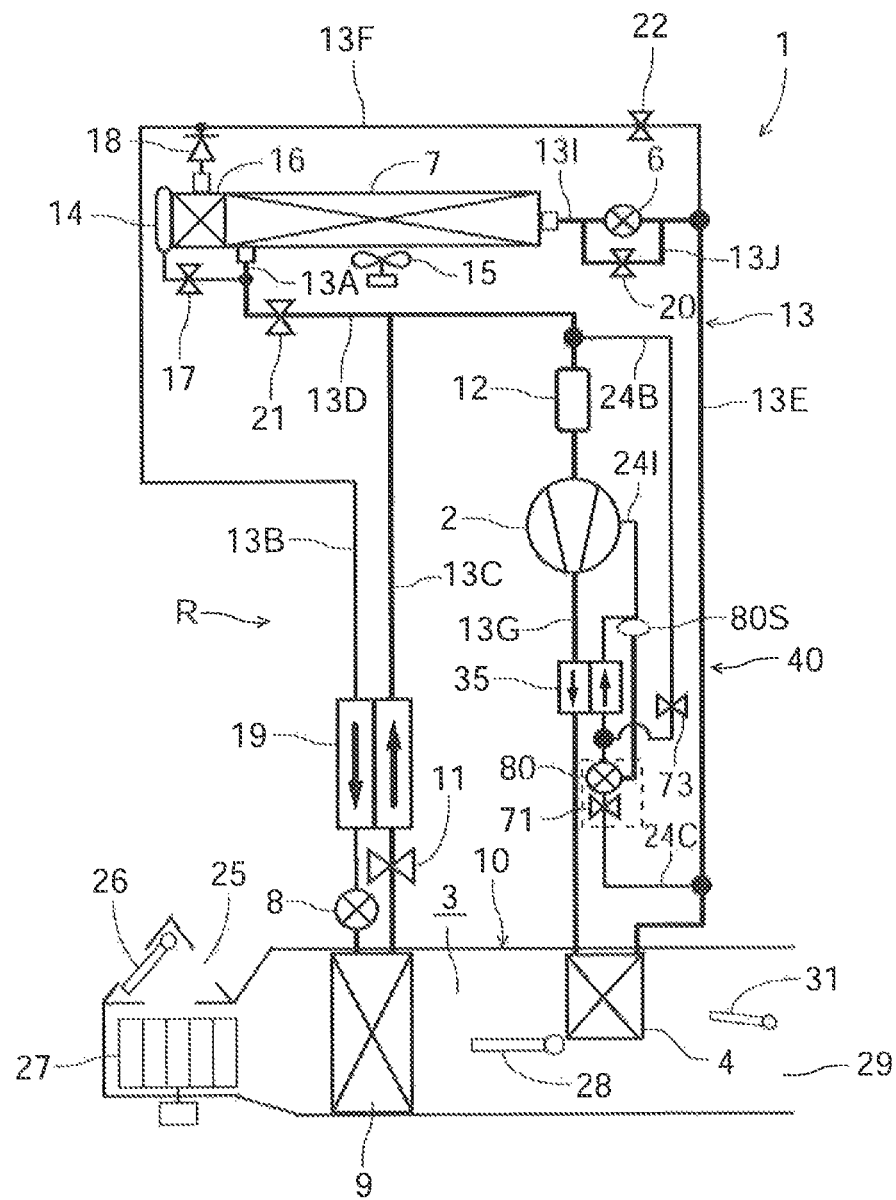
FIG. 18 is a constitutional view of a vehicle air conditioner of a further embodiment to which the present invention is applied.

Next, FIG. 18 shows a further constitutional view of the vehicle air conditioner 1 of the present invention. In this embodiment, the return expansion valve 30 in the embodiment of FIG. 10 is replaced with the mechanical expansion valve 80 and the solenoid valve 71 in FIG. 13. The other constitution is similar to FIG. 10. Thus, an expansion valve constituted of an electric valve is replaced with the mechanical expansion valve and the solenoid valve, and hence cost reduction can be achieved while keeping a superheat degree during gas injection to be constant.

(8-5) Example 5 of Return Circuit

Figure 19:
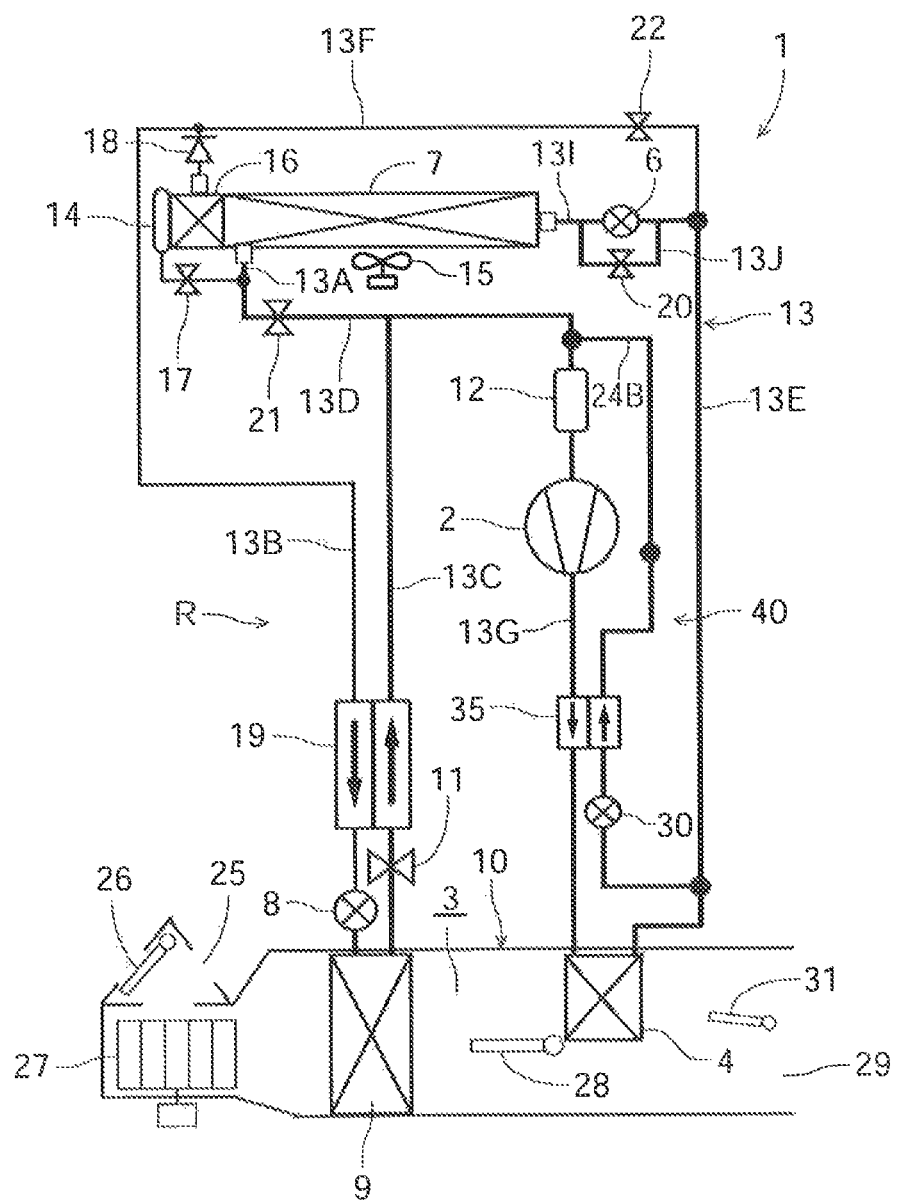
FIG. 19 is a constitutional view of a vehicle air conditioner of a further embodiment to which the present invention is applied.
Figure 20:
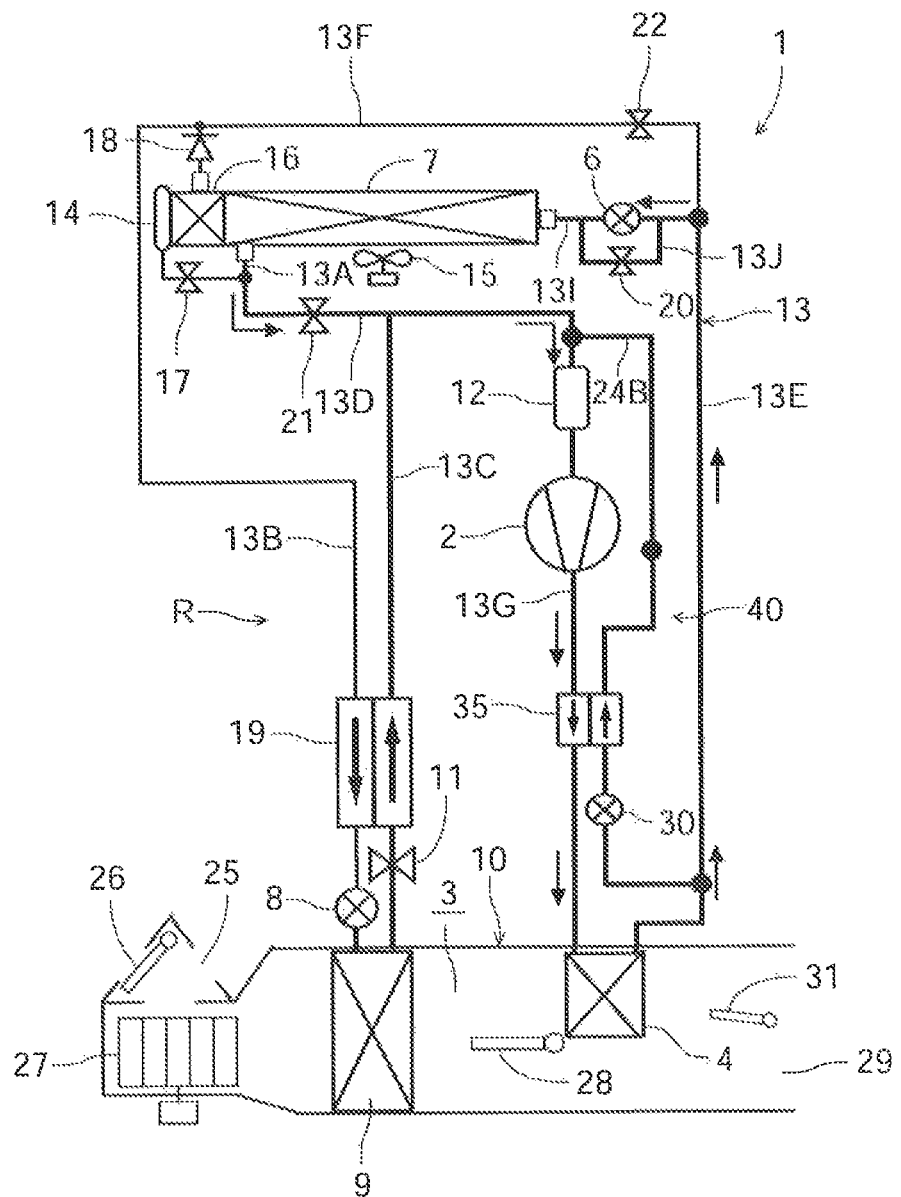
FIG. 20 is a view to explain a flow of a refrigerant of the vehicle air conditioner of FIG. 19 during usual heating in which a refrigerant is passed through an outdoor heat exchanger.
Figure 21:
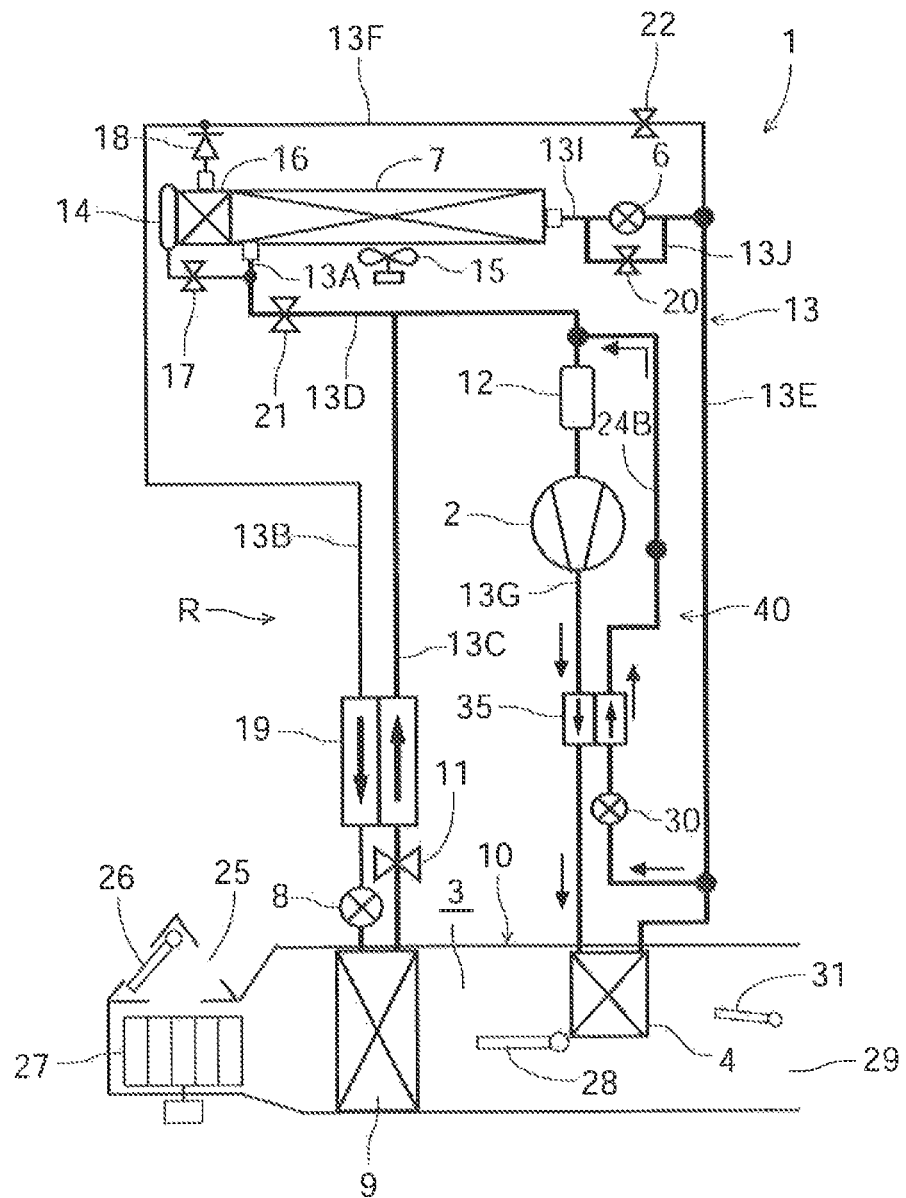
FIG. 21 is a view to explain a flow of the refrigerant of the vehicle air conditioner of FIG. 19 during bypassing of a bypass circuit.

It is to be noted that in the invention of claim 1 to claim 6 of the present application, in the above examples of FIG. 1, FIG. 10, FIG. 13, FIG. 17 and FIG. 18, an injection circuit 24I may be eliminated. FIG. 19 to FIG. 21 show a case where the injection circuit 24I is eliminated from the example of FIG. 1. In this case, only one end of a bypass circuit 24B is branched from a refrigerant pipe 13E immediately after a radiator 4. Further, in the bypass circuit 24B, a return expansion valve 30 and a discharge side heat exchanger 35 are disposed, and the other end of the bypass circuit is connected to an inlet of an accumulator 12.

Therefore, in this embodiment, the bypass circuit 24B having the return expansion valve 30 and the discharge side heat exchanger 35 constitute a return circuit 40. Further, in a usual heating mode, the return expansion valve 30 is closed and a refrigerant is passed as shown by arrows in FIG.

20, and in a non-frost mode, an outdoor expansion valve 6 and solenoid valves 20 and 22 are closed and the return expansion valve 30 is opened to pass all the refrigerant through the bypass circuit 24B as shown by arrows in FIG. 21. The refrigerant flowing through the bypass circuit 24B is throttled by the return expansion valve 30, evaporates in the discharge side heat exchanger 35 and returns to the accumulator 12, and hence also according to such a memory, it is possible to enjoy the effect by the bypass circuit 24B.

(8-6) Example 6 of Return Circuit

Figure 22:
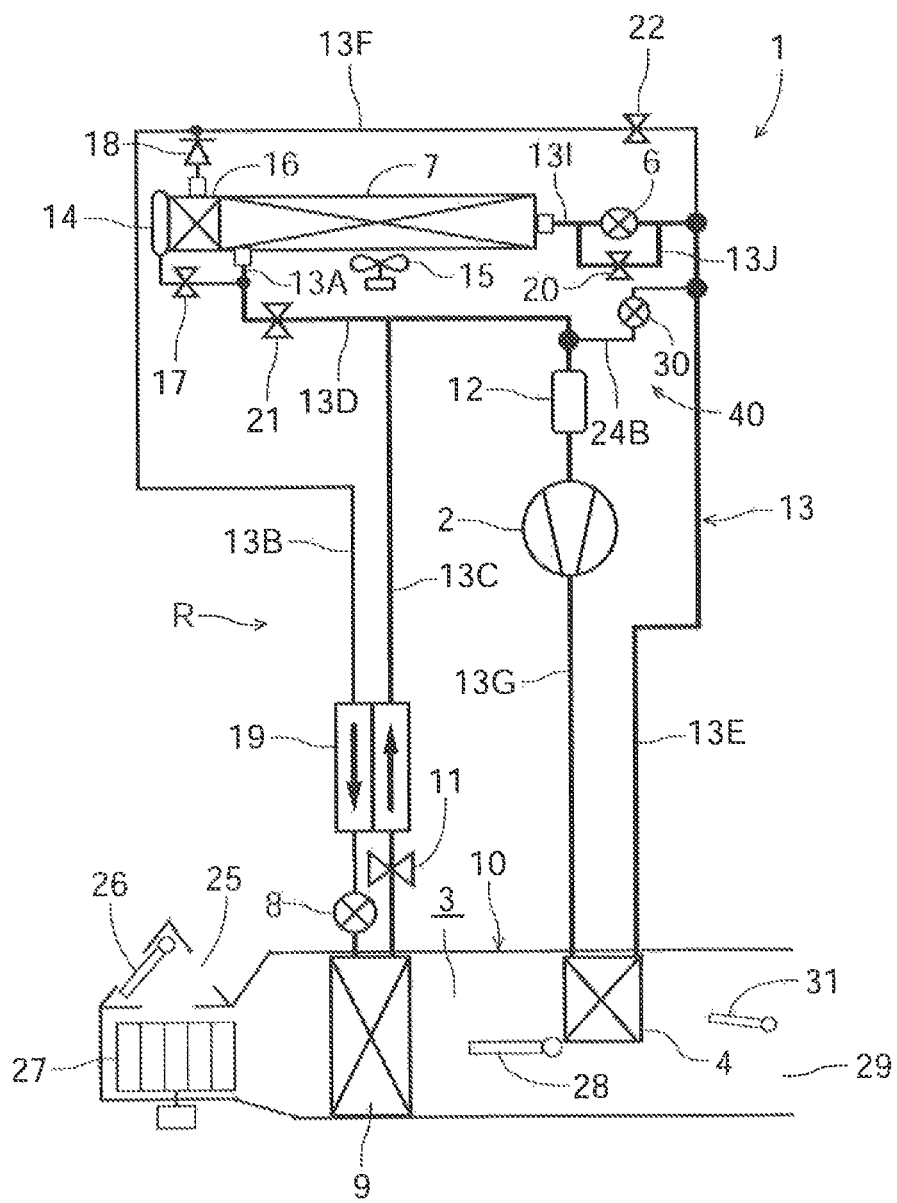
FIG. 22 is a constitutional view of a vehicle air conditioner of a still further embodiment to which the present invention is applied.

It is to be noted that FIG. 22 shows another example of a constitution where an injection circuit is not present. In this case, a discharge side heat exchanger 35 is also eliminated, but a bypass circuit 24B constituting a return circuit 40 is branched from a refrigerant pipe 13E as close as possible to an outdoor expansion valve 6, i.e., the refrigerant pipe 13E immediately before branched to a bypass pipe 13J or 13F. According to such a constitution, it is possible to reduce a tube length of the bypass circuit 24B.

Additionally, also in this case, the outdoor expansion valve 6 is closed to open a return expansion valve 30, and a refrigerant flowing out from a radiator 4 is all passed through the bypass circuit 24B. Additionally, by opening the return expansion valve 30 while opening the outdoor expansion valve 6, and passing the refrigerant through both an outdoor heat exchanger 7 and the bypass circuit 24B to pump up heat from outdoor air while inhibiting frost formation to the outdoor heat exchanger 7, it is possible to maintain a required heating capability in the bypass circuit 24B.

Here, in the above respective embodiments, the refrigerant is returned to the inlet side of the accumulator 12 connected to the suction side of the compressor 2 by the bypass circuit 24B, but when the refrigerant to be returned to the compressor 2 by the discharge side heat exchanger 35 or the other means can be the gas refrigerant, the refrigerant can directly be returned to the compressor 2 by connecting the bypass circuit 24B to the suction side of the compressor 2.

Additionally, in the embodiments, the present invention is applied to the vehicle air conditioner 1 which changes and executes the respective operation modes of the heating mode, the dehumidifying and heating mode, the dehumidifying and cooling mode, and the cooling mode, but the present invention is not limited to the embodiments, and the present invention is also effective for a vehicle air conditioner which only performs the heating mode.

Additionally, when the frost of the outdoor heat exchanger 7 grows even in the frost formation inhibition of the embodiment, the outdoor heat exchanger 7 may be defrosted by passing, for example, the high-temperature refrigerant gas through the outdoor heat exchanger 7. Additionally, as the defrosting means, by reversing the flow of the refrigerant, by using an electric heater or the like, or simply by passing the air, the defrosting can effectively be performed.

Furthermore, the constitution of the refrigerant circuit R and the respective numeric values described in the respective embodiments are not limited, and are, needless to say, changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
12 accumulator
17, 20, 21, 22, 73 and 74 solenoid valve
23 three-way valve 23
24B bypass circuit
24I injection circuit
27 indoor blower (a blower fan)
28 air mix damper
30 return expansion valve
32 controller (control means)
35 discharge side heat exchanger
40 return circuit
80 expansion valve
R refrigerant circuit

The invention claimed is:

1. A vehicle air conditioner comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an injection circuit which distributes a part of the refrigerant flowing out from the radiator to return the part to the middle of the compression by the compressor;
decompressing means for decompressing the refrigerant flowing through the injection circuit;
a discharge side heat exchanger which performs heat exchange between the refrigerant decompressed by the decompressing means and the refrigerant discharged from the compressor before flowing into the radiator;
an outdoor heat exchanger disposed outside the vehicle interior to let the refrigerant radiate or absorb heat; and
control means,
at least the control means being configured to execute a heating mode in which the refrigerant discharged from the compressor radiates heat in the radiator and the refrigerant by which heat has been radiated is decompressed and then absorbs heat in the outdoor heat exchanger,
the vehicle air conditioner comprising:
a bypass circuit disposed from a refrigerant outlet side of the radiator to a suction side of the compressor,
wherein the control means has a mode in which all or a part of the refrigerant flowing out from the radiator is passed through the bypass circuit and is not passed through the outdoor heat exchanger but is returned to the suction side of the compressor.

2. The vehicle air conditioner according to claim 1, wherein the control means has frost formation condition estimating means for estimating a frost formation condition to the outdoor heat exchanger, and passes the refrigerant through the bypass circuit when frost is formed to the outdoor heat exchanger or when the frost formation to the outdoor heat exchanger is predicted on the basis of the estimation of the frost formation condition estimating means.

3. The vehicle air conditioner according to claim 1, wherein the control means passes the refrigerant through the bypass circuit, when an external power source supplies power to the compressor or a battery which supplies the power to drive the compressor.

4. The vehicle air conditioner according to claim 1, comprising:
  decompressing means for decompressing the refrigerant flowing through the bypass circuit; or
  the decompressing means and a discharge side heat exchanger which performs heat exchange between the refrigerant decompressed by the decompressing means and the refrigerant discharged from the compressor before flowing into the radiator.

5. The vehicle air conditioner according to claim 4,
  wherein the control means controls a subcool degree of the refrigerant in an outlet of the radiator by the decompressing means, when the control means passes the refrigerant through the bypass circuit.

6. The vehicle air conditioner according to claim 1,
  wherein the control means has a mode in which the refrigerant flowing out from the radiator is passed through the outdoor heat exchanger and the bypass circuit.

7. The vehicle air conditioner according to claim 1,
  wherein the control means controls a superheat degree of the refrigerant returning to the compressor by the decompressing means, when the control means passes the refrigerant through the injection circuit.

8. The vehicle air conditioner according to claim 1,
  wherein the bypass circuit and the injection circuit form a common circuit on an upstream side of the refrigerant, and in this common circuit, there are disposed decompressing means for decompressing the refrigerant and a discharge side heat exchanger which performs heat exchange between the refrigerant decompressed by the decompressing means and the refrigerant discharged from the compressor before flowing into the radiator, and the bypass circuit and the injection circuit are branched in a distributing valve device positioned on a downstream side of the discharge side heat exchanger.

9. The vehicle air conditioner according to claim 1,
  wherein the control means has a mode in which the refrigerant flowing out from the radiator is passed through the bypass circuit and the injection circuit.

10. The vehicle air conditioner according to claim 7,
  wherein the control means has a mode in which the refrigerant flowing out from the radiator is passed through the outdoor heat exchanger, the bypass circuit and the injection circuit.

11. A vehicle air conditioner comprising:
  a compressor which compresses a refrigerant;
  an air flow passage through which air to be supplied into a vehicle interior flows;
  a radiator disposed in the air flow passage to let the refrigerant radiate heat;
  a heat absorber disposed in the air flow passage to let the refrigerant absorb heat;
  an injection circuit which distributes a part of the refrigerant flowing out from the radiator to return the part to the middle of the compression by the compressor
  an outdoor heat exchanger disposed outside the vehicle interior to let the refrigerant radiate or absorb heat; and
  control means,
  at least the control means being configured to execute a heating mode in which the refrigerant discharged from the compressor radiates heat in the radiator and the refrigerant by which heat has been radiated is decompressed and then absorbs heat in the outdoor heat exchanger,
  the vehicle air conditioner comprising:
  a bypass circuit disposed from a refrigerant outlet side of the radiator to a suction side of the compressor,
  wherein the control means has a mode in which all or a part of the refrigerant flowing out from the radiator is passed through the bypass circuit and is not passed through the outdoor heat exchanger but is returned to the suction side of the compressor,
  wherein the bypass circuit and the injection circuit form a common circuit on an upstream side of the refrigerant, and in this common circuit, there are disposed decompressing means for decompressing the refrigerant and a discharge side heat exchanger which performs heat exchange between the refrigerant decompressed by the decompressing means and the refrigerant discharged from the compressor before flowing into the radiator, and the bypass circuit and the injection circuit are branched in a distributing valve device positioned on a downstream side of the discharge side heat exchanger.

12. The vehicle air conditioner according to claim 11,
  wherein the control means controls a superheat degree of the refrigerant returning to the compressor by the decompressing means, when the control means passes the refrigerant through the injection circuit.

13. The vehicle air conditioner according to claim 11,
  wherein the control means has frost formation condition estimating means for estimating a frost formation condition to the outdoor heat exchanger, and passes the refrigerant through the bypass circuit when frost is formed to the outdoor heat exchanger or when the frost formation to the outdoor heat exchanger is predicted on the basis of the estimation of the frost formation condition estimating means.

14. The vehicle air conditioner according to claim 11,
  wherein the control means passes the refrigerant through the bypass circuit, when an external power source supplies power to the compressor or a battery which supplies the power to drive the compressor.

15. The vehicle air conditioner according to claim 11, comprising:
  decompressing means for decompressing the refrigerant flowing through the bypass circuit; or
  the decompressing means and a discharge side heat exchanger which performs heat exchange between the refrigerant decompressed by the decompressing means and the refrigerant discharged from the compressor before flowing into the radiator.

16. The vehicle air conditioner according to claim 15,
  wherein the control means controls a subcool degree of the refrigerant in an outlet of the radiator by the decompressing means, when the control means passes the refrigerant through the bypass circuit.

17. The vehicle air conditioner according to claim 11,
  wherein the control means has a mode in which the refrigerant flowing out from the radiator is passed through the outdoor heat exchanger and the bypass circuit.

18. The vehicle air conditioner according to claim 11,
  wherein the control means has a mode in which the refrigerant flowing out from the radiator is passed through the bypass circuit and the injection circuit.

19. The vehicle air conditioner according to claim 11,
  wherein the control means has a mode in which the refrigerant flowing out from the radiator is passed through the outdoor heat exchanger, the bypass circuit and the injection circuit.

20. The vehicle air conditioner according to claim 11,
decompressing means for decompressing the refrigerant flowing through the injection circuit; and
a discharge side heat exchanger which performs heat exchange between the refrigerant decompressed by the decompressing means and the refrigerant discharged from the compressor before flowing into the radiator.

* * * * *